United States Patent [19]

Nagano

[11] Patent Number: 4,819,219
[45] Date of Patent: Apr. 4, 1989

[54] TRACK JUMP CONTROL SYSTEM FOR OPTICAL DISK APPARATUS

[75] Inventor: Katsumi Nagano, Setagaya, Japan

[73] Assignee: Kabushiki Kaisha Toshiba, Kanagawa, Japan

[21] Appl. No.: 29,993

[22] Filed: Mar. 25, 1987

[30] Foreign Application Priority Data

| Mar. 25, 1986 | [JP] | Japan | 61-66303 |
| Apr. 30, 1986 | [JP] | Japan | 61-99545 |
| Apr. 30, 1986 | [JP] | Japan | 61-99546 |
| Apr. 30, 1986 | [JP] | Japan | 61-99547 |
| Apr. 30, 1986 | [JP] | Japan | 61-99548 |

[51] Int. Cl.$^4$ .............................................. G11B 17/22
[52] U.S. Cl. .................................... 369/32; 369/33; 369/43; 369/44
[58] Field of Search ............... 358/342; 369/32, 45, 369/33, 41, 44; 360/72.2, 78, 72.1, 73, 75; 365/234, 230

[56] References Cited

U.S. PATENT DOCUMENTS

| 4,567,534 | 1/1986 | Groen et al. | 358/342 |
| 4,701,898 | 10/1987 | Giddings | 358/342 |

Primary Examiner—William M. Shoop, Jr.
Assistant Examiner—Brian K. Young
Attorney, Agent, or Firm—Finnegan, Henderson, Farabow, Garrett & Dunner

[57] ABSTRACT

To accurately achieve plural-track jump operations at high speed in an optical disk apparatus, a first embodiment is provided in which an analog track jump signal is applied to move an optical beam. The analog track jump signal includes a kick pulse for acceleration, a constant pulse for constant drive, and a stop pulse for deceleration. In a second embodiment, a digital track jump signal is applied to move an optical beam. An erroneous track jump detecting circuit is additionally provided for detecting whether the optical beam correctly jumps over a designated number of tracks by comparing a number of plural track jump signals corresponding to the designated number of tracks to be jumped with the number of track signals generated when the beam jumps across a track.

13 Claims, 22 Drawing Sheets

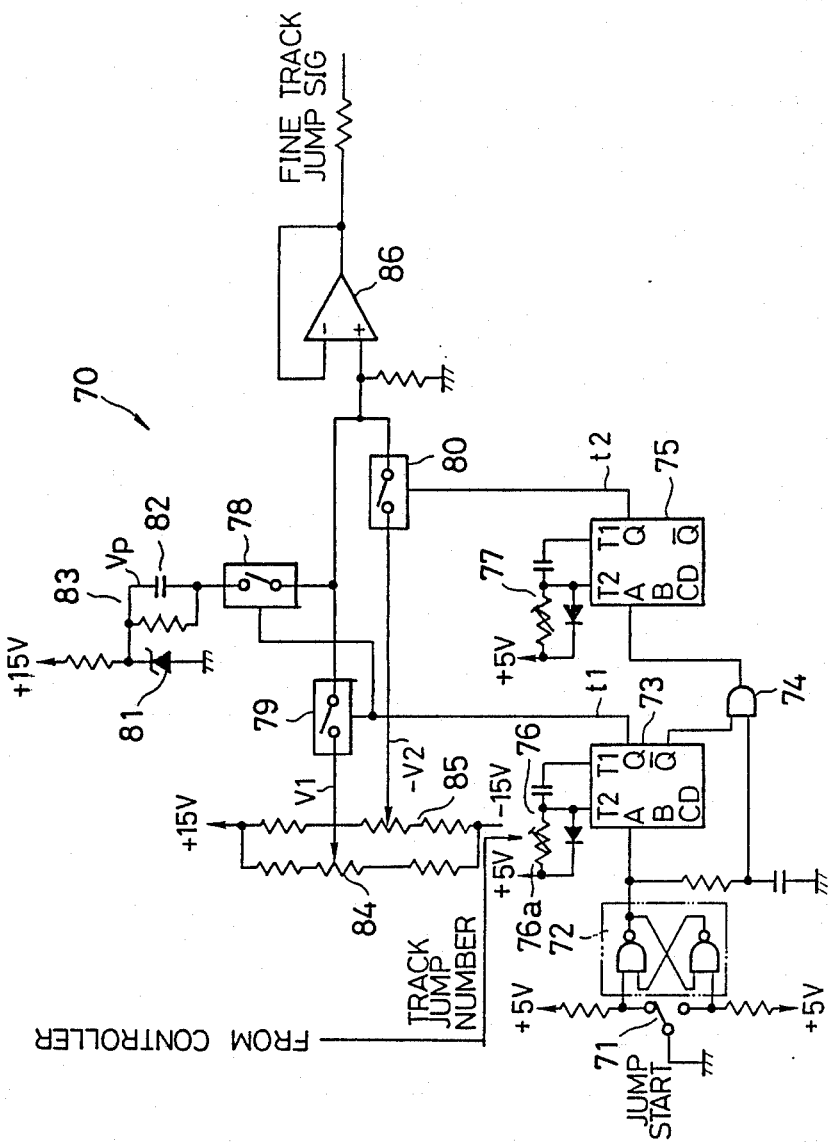
F I G . 2

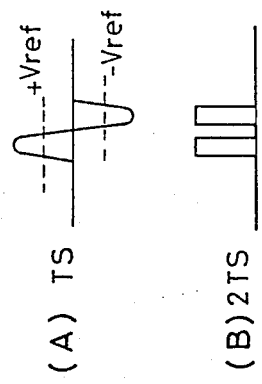
FIG.16
(A) TS
(B) 2TS
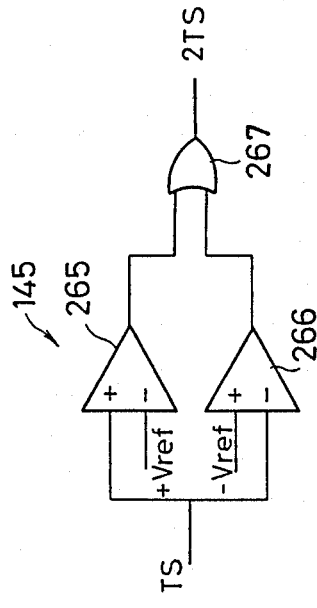
FIG.15
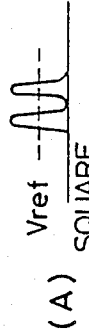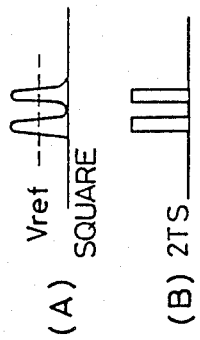
FIG.18
(A) SQUARE
(B) 2TS
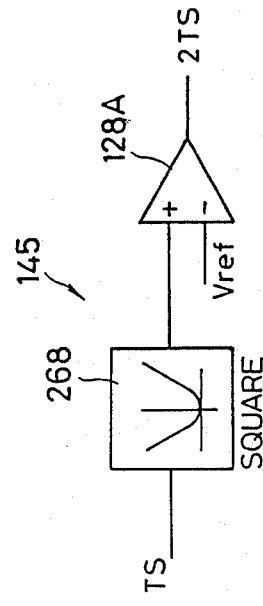
FIG.17

TRACK JUMP CONTROL SYSTEM FOR OPTICAL DISK APPARATUS

BACKGROUND OF THE INVENTION

1. Field of the Invention

The present invention relates to a track jump control system for an optical information recording apparatus such as an optical disk apparatus by which information is recorded in or reproduced from an optical disk through an optical beam.

2. Description of the Related Art

Recently, optical disk apparatus have been widely used for storing image information since such apparatus can record a great deal of image information, such as documents. Surface information on a disk is photoelectrically transduced by two-dimensionally scanning the disk with a light beam. The transduced image information data are recorded in an image recorded apparatus, and the recorded data are retrieved or reproduced from the apparatus. e.g., by printing as hard copy.

An optical disk for recording information in spiral fashion has generally been used for the optical recording apparatus. Information is recorded or reproduced on the disk by an optical or light beam generated from an optical head moved in a straight line along the radial direction of the disk by a linear motor. The optical head is moved along a linear scale at a high speed to gain access to a target track with the light beam appropriately focused on the disk surface through an object lens. After the head has been moved, the track number at which the optical beam is located is read from the disk. If the track number thus read is not equal to the target track number, the optical beam of the head is moved (jumped) track-by-track until it is located at the target track. However, when the difference between the traget track number and the actual track number is significant, e.g., several tens of tracks, a problem arises in that, since the track jump process is effected track-by-track, the access time for the track jump operation is excessive.

SUMMARY OF THE INVENTION

Accordingly, it is an intent of the present invention to provide a track jump control system for an optical disk apparatus which allows an optical beam to jump over a designated number of tracks in a single, substantially continuous movement accurately and with high speed.

Additional intentions and advantages of the invention will be set forth in the description which follows, and in part will be obvious from the description, or may be learned by practice of the invention. The inventions and advantages of the invention may be realized and obtained by means of the instrumentalites and combinations particularly pointed out in the appended claims.

To achieve the foregoing intentions, a first embodiment of the track jump control system of the present invention, which may be used for recording and reproducing information in or from an optical disk using an optical beam, includes optical beam moving means for moving the optical beam in a radial direction along a radial dimension of the optical disk, and track jump signal generating means for providing an analog track jump signal to the optical beam moving means to cause the beam moving means to jump the optical beam over a designated number of tracks in a single, substantially continuous movement in response to a track jump command signal, e.g., from a controller. The analog track jump signal includes a kick pulse with a peak voltage $V_p$ for accelerating the optical beam, a constant amplitude pulse with a voltage $V_1$ for moving the optical beam at a constant speed, and a reverse stop pulse with a voltage $-V_2$ for decelerating the moving optical beam. These three voltages $V_p$, $V_1$, $-V_2$ have sequentially decreasing voltage levels. Further, the time duration of the constant amplitude pulse is variable and is regulated according to the designated number of tracks to be jumped.

In addition, and also to achieve the intentions of the invention, a second embodiment of the track jump control system, which may also be used for recording and reproducing information in or from an optical disk using an optical beam, includes optical beam moving means for moving the optical beam in a radial direction along a radial dimension of the optical disk, track jump signal generating means for providing a digital track jump signal to the optical beam moving means to cause the beam moving means to jump the optical beam over a designated number of tracks in a single, substantially continuous movement in response to a track jump command signal, track signal generating means for generating a track signal when the optical beam jumps across a track on the optical disk, and erroneous track jump detecting means for using the track jump signal to detect whether the optical beam has correctly jumped over the designated number of tracks.

The erroneous track jump detecting means tests for a correct plural-track jump operation by comparing track access signals with tracks signals (each generated when an optical beam jumps across a track), by comparing double track access signals with double track signals, or by simply checking only the least significant bit of the double track signals.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. Of the drawings:

FIG. 2 is a detailed block diagram of a fine track jump signal generator which may be incorporated into the system shown in FIG. 1;

FIG. 15 is a circuit diagram showing an example of a double track signal generator which may be incorporated in the system shown in FIG. 14;

FIG. 16 is a timing chart of two signals of the double track signal generator shown in FIG. 15;

FIG. 17 is a circuit diagram showing another example of a double track signal generator which may be incorporated in the system shown in FIG. 14;

FIG. 18 is a timing chart of two signals of the double track signal generator shown in FIG. 17;

DESCRIPTION OF THE PREFERRED EMBODIMENTS

Figure 1:
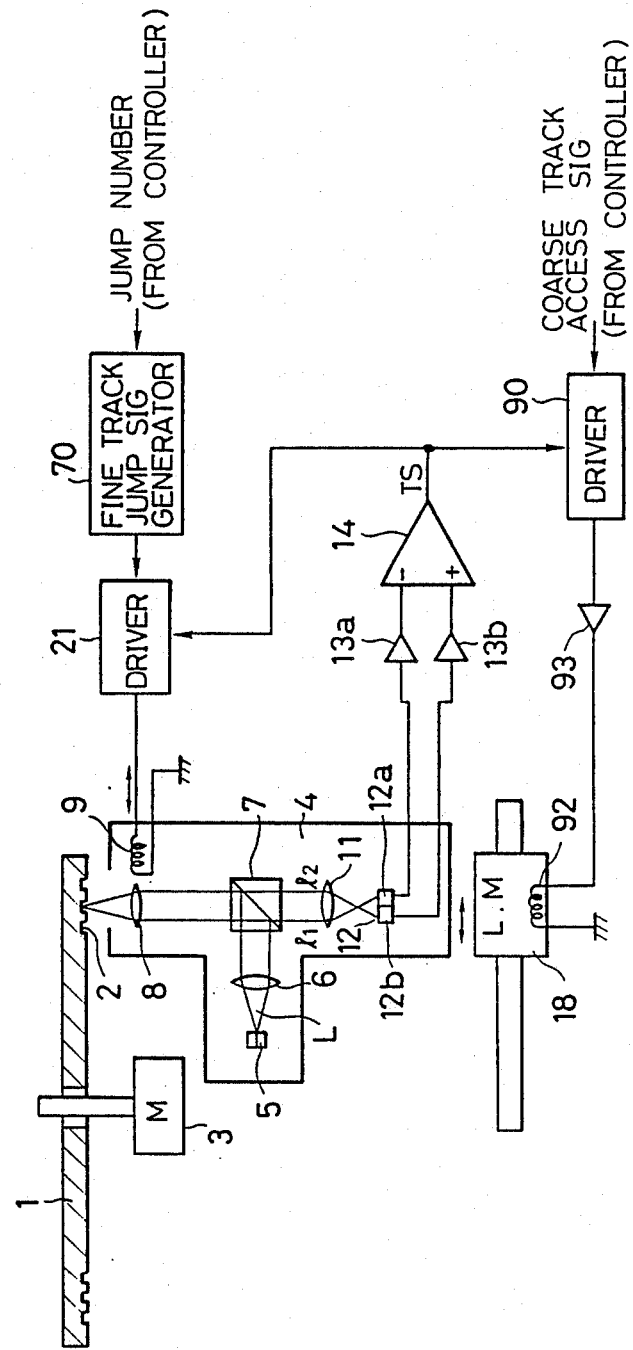
FIG. 1 is a schematic block diagram of a first embodiment of the track jump control system of analog type according to the present invention.

Reference will now be made in detail to the present preferred embodiments of the invention as illustrated in the accompanying drawings, wherein like reference characters designate like or corresponding parts throughout the several drawings.

A first embodiment of the track jump control system according to the present invention, of analog type, will now be described with reference to FIG. 1 to 5. A schematic block diagram of an optical disk apparatus is shown in FIG. 1. An optical disk 1 is rotated at a constant speed relative to an optical head 4 by a motor 3. The optical disk 1 is made of, for example, a glass or a plastic. On the circular substrate surface of the disk, a metallic layer such as telluride or bismuth is coated in doughnut shape. Behind or under the optical disk 1, an optical head 4 is provided for recording and reproducing information in or from the disk 1.

The optical head 4 is constructed and operates as follows. A divergent laser light L is generated from, for example, a semiconductor laser light source 5. In recording information on a recording film 2 of the optical disk 1, the intensity of the generated laser light L is modulated according to the invention to be recorded. In reproducing information from the recording film 2, a laser light L with a constant intensity is irradiated upon the disk.

The divergent laser light L generated from the semiconductor laser source 5 is formed into a parallel light beam through a collimator lens 6 and then introduced into a beam splitter 7. The laser beam introduced into beam splitter 27 is directed to an object lens 8 which focuses the beam on the recording film 2 of the optical disk 1. The object lens 8 is supported by the head 4 and is movable in the direction perpendicular to the optical axis of the optical head 4, i.e., parallel to the recording surface of disk 1. When the object lens 8 is located at a predetermined track position, a laser beam focused through the object lens 8 is irradiated upon the surface of the recording film 2 on the disk 1 to form a minimum diameter beam spot on the recording film 2. Under these conditions, the object lens 8 so located is focused and tracked, thus enabling the apparatus to perform information writing and reading operations.

The divergent laser light reflected from the recording film 2 on the disk 1 is converted into a parallel beam through the object lens 8 and then returned to the beam splitter 7. The laser beam passing through the beam splitter 7 is introduced onto an optical sensor 12 through a projective lens 11. This optical sensor 12 is made up of two optical sensor cells $12a$, $12b$ for transducing an optical image formed through the projective lens 11 into electric signals. The output signals of the optical sensor cells $12a$, $12b$, and, equivalently, of the optical head 4 are available as a tracking offset correcting signal as well as an information reproducing signal.

More specifically, the two outputs of the optical sensor cells $12a$, $12b$ are applied to two amplifiers $13a$, $13b$, respectively. An output of the amplifier $13a$ is applied to an inverting input terminal ($-$) of a differential amplifier 14, while an output of the amplifier $13b$ is applied to a non-inverting input terminal ($+$) of the differential amplifier 14 to obtain a track offset detecting signal (also referred to here as track signal TS).

When the beam spot is centered upon and, thus, correctly irradiated upon a track, this track signal TS is zero. However, if the beam spot is offset from the center of a track, a positive or negative track signal $+TS$ or $-TS$ is outputted from the differential amplifier 14 according to the offset magnitude and direction. When the beam spot jumps over a plurality of tracks, this track signal TS has a plurality of peaks corresponding to the number of tracks jumped as shown in FIG. 3(e).

A driver 21 is provided which includes a switch for selectively connecting an object lens moving coil 9 to the output of the differential amplifier 14 or to a fine track jump signal generator 70. When the differential amplifier 14 is connected to the coil 9, the apparatus can perform an automatic tracking operation to correctly locate the beam spot at a particular track. When the fine track jump signal generator 70 is connected to the coil 9, the apparatus can perform a plural-track jump operation in which the beam spot is jumped over a designated number of tracks.

Operationally, the driver 21 supplies a current or current component to the coil 9 according to an output signal of the differential amplifier 14 to move the object lens 8 in directions parallel to the recording surface 2 of the optical disk 1 so that a track offset is corrected. In addition, driver 21 supplies another current or current component to the coil 9 according to a fine track jump signal (or track jump signal) from the fine track jump signal generator 70 to move the object lens 8 in the same direction so that a track jump or move over a designated number of tracks can be performed substantially continuously, i.e., a plurality of tracks can be jumped with a single movement of the head 4 rather than track-by-track movement.

The output of the differential amplifier 14 is also applied to a driver 90 to which a coarse track access signal is applied from a controller (not shown). The driver 90 supplies a current to a coil 92 of a linear motor 18 via an amplifier 93 according to the coarse track access signal from the controller, which is representative of a track number to be accessed, to move the head 4 in directions parallel to the recording surface 2 of the optical disk 1. Accordingly, the optical beam can be coarsely located at a target track.

It should be noted that, as described above, the fine track jump signal generator 70 outputs a fine track jump signal to move the object lens 8 and, thus, the tracking position of the beam spot, across a designated number of tracks in a substantially continuous fashion. Since the number of tracks to be jumped as designated by the controller will vary, the pulse width of the fine track jump signal will vary correspondingly.

The fine track jump signal generator 70 will now be described in further detail with reference to FIGS. 2 and 3. The generator 70 comprises a start switch 71, a flip-flop (FF circuit) 72, a first monostable multivibrator (MM) circuit 73, an AND gate 74, a second MM circuit 75, two time constant circuits 76, 77, three analog switches 78, 79, 80, a constant kick voltage circuit 83, a bridge or potentiometer circuit 84, and an amplifier 86.

The start switch 71 is turned on (i.e., closed) to start a track jump operation in response to a track jump command signal supplied from the controller (not shown) to set the FF circuit 72. In response to a set signal of the FF circuit 72, the MM circuit 73 outputs a pulse with a pulse width $t_1$ (e.g., $t_1 = 1.3$ msec). A reset output of this MM circuit 73 and a set output of the FF circuit 72 are ANDed by the AND gate 74 to produce an AND product signal which is outputted from AND gate 74.

In response to this AND product signal from the AND gate 74, the MM circuit 75 outputs a pulse with a pulse width $t_2$ (e.g., $t_2 = 1.0$ msec). The MM circuits 73 and 75 include a time constant circuits 76 and 77, respectively, for determining the pulse widths $t_1$ and $t_2$. It should be noted that a variable resistor 76a is connected to the controller and is adjusted in accordance with designated number of tracks to be jumped. The analog switches 78, 79 are closed or turned on in response to an output from the MM circuit 73, while the analog switch 80 is closed to turned on in response to an output from the MM circuit 75.

When the analog switch 78 is turned on, a kick voltage $V_1$ (e.g., $V_p = 5$ V) (an acceleration voltage) regulated by a Zener diode 81 is applied to the capacitor 82, so that a differentiated kick current is passed through the analog switch 78. The time constant of the kick voltage can be determined by the capacitive-resistive (CR) circuit 83.

When the analog switch 79 is turned on, a constant voltage $V_1$ (e.g., $V_1 = 1$ V) a constant speed voltage) is supplied from the bridge circuit 84. When the analog switch 80 is turned on, a reverse voltage $-V_2$ (e.g., $-1.5$ V) (a deceleration voltage) is supplied from the bridge circuit 85. These voltages $V_p$, $V_1$, $-V_2$ selectively supplied through the analog switches 78, 79, 80 are amplified by the amplifier 86 to obtain a fine track jump signal for moving the object lens 8 so that the optical beam spot jumps over the designated number of tracks.

The operation of the fine track jump signal generator 70 will now be described in further detail. When the start switch 71 is turned on, the FF circuit 72 is set, and the MM circuit 73 is triggered in response to a set signal of the FF circuit 72 to turn on the analog switches 78, 79. Therefore, the kick voltage $V_p$ provided through the capacitor 82 is outputted via the analog switch 78 and the amplifier 86 as a first part of a fine track jump signal. The kick voltage $V_p$ drops exponentially. After the kick voltage $V_p$ reaches the constant voltage $V_1$ supplied from the bridge circuit 84 via the analog switch 79, the constant voltage $V_1$ is provided via the amplifier 86 as a second part of the fine track jump signal. After a predetermined time $t_1$ determined by the first MM circuit 73 has elapsed, the MM circuit 73 is reset, so that the analog switches 78, 79 are turned off. At that time, a reset output of the MM circuit 73 and a set output of the FF circuit 72 are ANDed by the AND gate 74 to output an AND product signal. In response to this AND product signal, the MM circuit 75 is triggered to turn on the analog switch 80. Therefore, the reverse voltage $V_2$ of the bridge circuit 85 is outputted via the analog switch 80 and the amplifier 86 as a third part of the fine track jump signal.

As a result, it is possible to generate a fine track jump signal as shown in FIG. 3(d). On the basis of this signal, the object lens 8 is moved for the time $t_1$ by $V_p$ and $V_1$, and stopped for the time $t_2$ by $-V_2$ after $t_1$ has elapsed. Accordingly, the object lens 8 is first accelerated by the kick voltage $V_p$ for a short time before being moved by the constant voltage $V_1$. FIG. 3(e) shows an example of waveforms outputted from the differential amplifier 14 in which the number of peaks (e.g., 10) corresponds to the number of tracks jumped.

Figure 3:
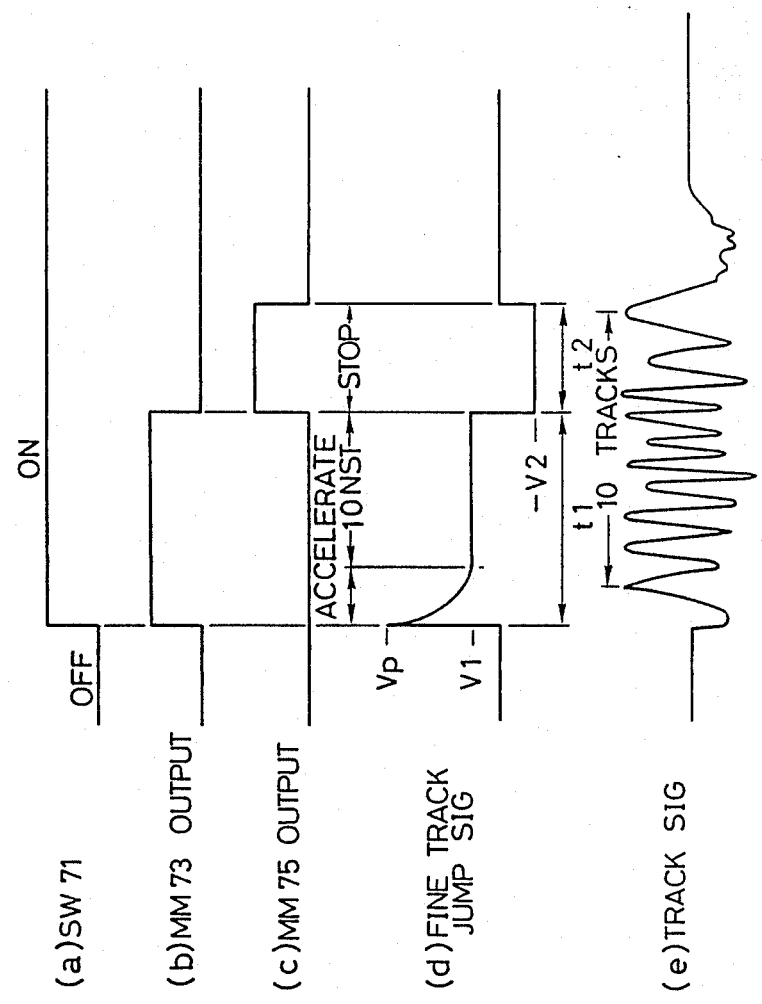
FIG. 3 is a timing chart showing various signal waveforms of the first embodiment of the track jump control system shown in FIGS. 1 and 2.

FIG. 3 shows the case where ten tracks are jumped. However, the pulse width $t_1$ of the pulse outputted from the MM circuit 73 can be changed by adjusting the value of the variable resistor 76a of the time constant circuit 76 according to the track jump command signal supplied from a controller (not shown) to correspond to the number of tracks to be jumped.

Figure 4:
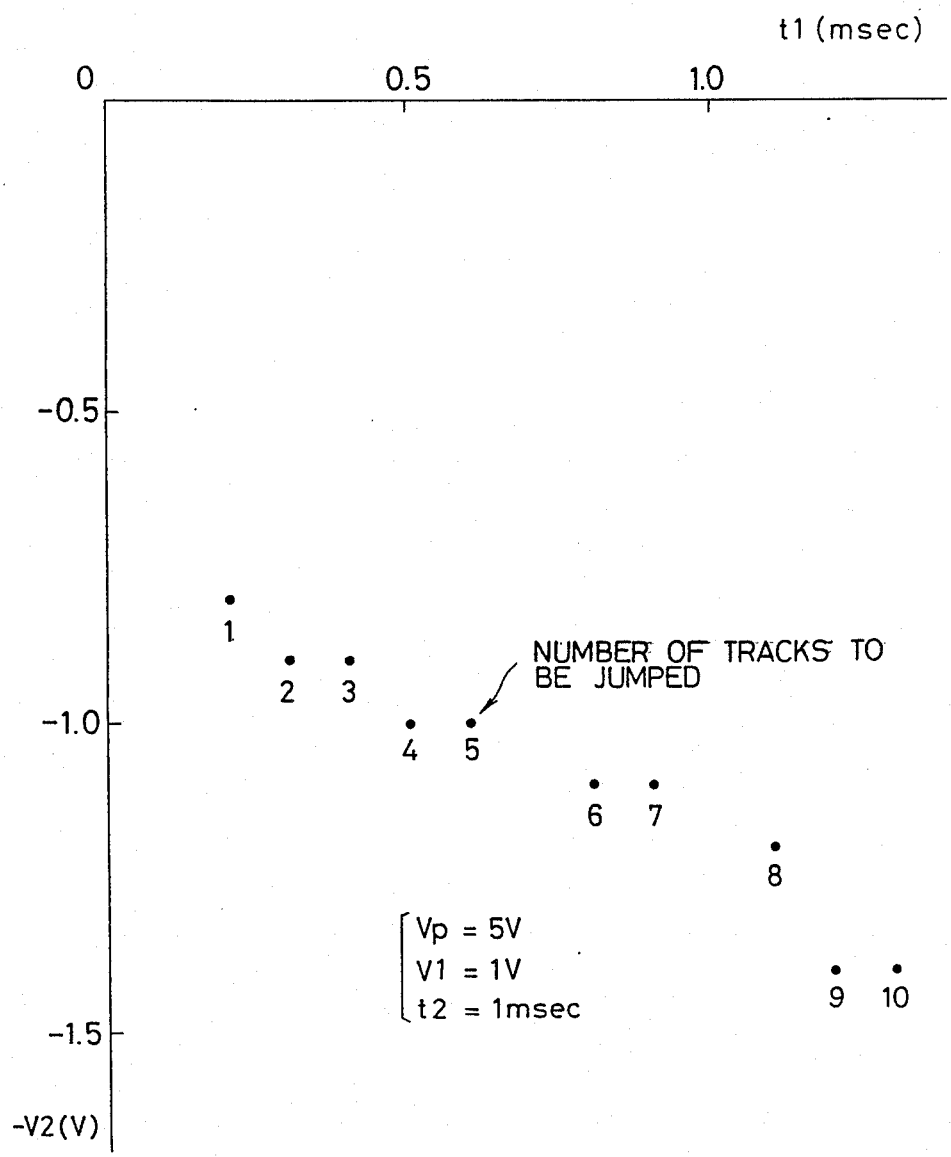
FIG. 4 is a graphical representation of the relationship between the pulse width $t_1$ and the stop voltage $-V_2$ of the track jump signal with the number of tracks to be jumped as a parameter and other variables fixed.

FIG. 4 shows the relationship between the time $t_1$ and the reverse voltage $-V_2$ with the number of jumped tracks as a parameter under the conditions that $V_p = 5$ V, $V_1 = 1$ V, and $t_2 = 1$ msec. This graph indicates that the drive time $t_1$ is determined according to the number of tracks to be jumped and, further, the reverse voltage $-V_2$ for braking should be increased with an increasing number of tracks to be jumped because the object lens moving speed increases with the increasing number of tracks.

The general operation of the optical disk apparatus will now be described. A laser light L generated by the semiconductor laser source 5 is guided to the object lens 8 via the collimator lens 6 and the beam splitter 7, and then focused onto the recording film 2 of the optical disk 1. To record information, a laser beam with a higher light intensity (recording beam) is irradiated to form bits along a track on the optical disk. To reproduce information, a laser beam with a lower light intensity (reproducing beam) is irradiated on the disk 1.

The reproducing beam reflected from the disk 1 is introduced into a projective lens 11 via the object lens 8 and the beam splitter 7, and then focused on the optical sensor 12. Therefore, two different signals can be outputted from the respective optical sensor cells 12a, 12b according to the intensity of the irradiated beams where a track offset exists.

In tracking operation, the two signals sensed by the two sensor cells 12a, 12b are independently applied to the differential amplifier 14 via the two amplifiers 13a, 13b, respectively, to obtain a tracking offset detecting signal (i.e., track signal) indicative of a difference between the two signals. The detected track signal is applied to the driver 21. In response to the track signal from the differential amplifier 14, the driver 21 supplies a current to the coil 9 to move the object lens 8 in parallel with the disk surface for tracking operation so that the beam spot can be located at an optimum tracking position.

In the track access operation, a coarse track access signal is applied from the controller (not shown) to the driver 90 to drive the linear motor 18 for moving the optical head 4. When the optical head 4 has been moved by the linear motor 18, a track number is read from the optical disk 1. The difference between the read track number and a target track number to be accessed is calculated by the controller. When the difference is 10 tracks, for example, the controller outputs a track number signal corresponding to 10 track jumps to the fine track jump signal generator 70. Therefore, in response to the track number signal, the generator 70 sets the variable resistor 76a to a value corresponding to 10 tracks, and simultaneously turns on the start switch 71. Accordingly, the fine track jump signal generator 70 outputs a fine track jump signal as shown in FIG. 3(d). As a result, the driver 21 supplies a predetermined current to the coil 9 according to the fine track jump signal from the generator 70 so that the object lens 8 is moved or jumped at essentially a constant speed in the radial direction across and over ten tracks. Where several tens of tracks are required to be jumped, the track jump operation is repeated 10 tracks per iteration.

As described above, with the track jump control apparatus of the present invention, it is possible to stably perform a track jump operation over a plurality of tracks at a high speed. Further, since the kick voltage $V_p$ and the pulse width $t_1$ can be freely determined according to the number of tracks to be jumped, it is possible to readily control the track jumping operation.

In the first embodiment of the invention, the fine track jump signal generator 70 is essentially an analog device. However, the generator 70 can also be configured to operate using digital data. In this case, the controller outputs various digital data indicative of the voltages $V_p$, $V_1$, $-V_2$ and the pulse widths $t_1$, $t_2$, the digital data are D/A converted into the analog data, and the analog data are synthesized into a fine track jump signal. The digital device is advantageous in that various values $V_p$, $V_1$, $-V_2$, $t_1$ and $t_2$ can be programmed by software to correspond to the number of tracks to be jumped.

Figure 5:
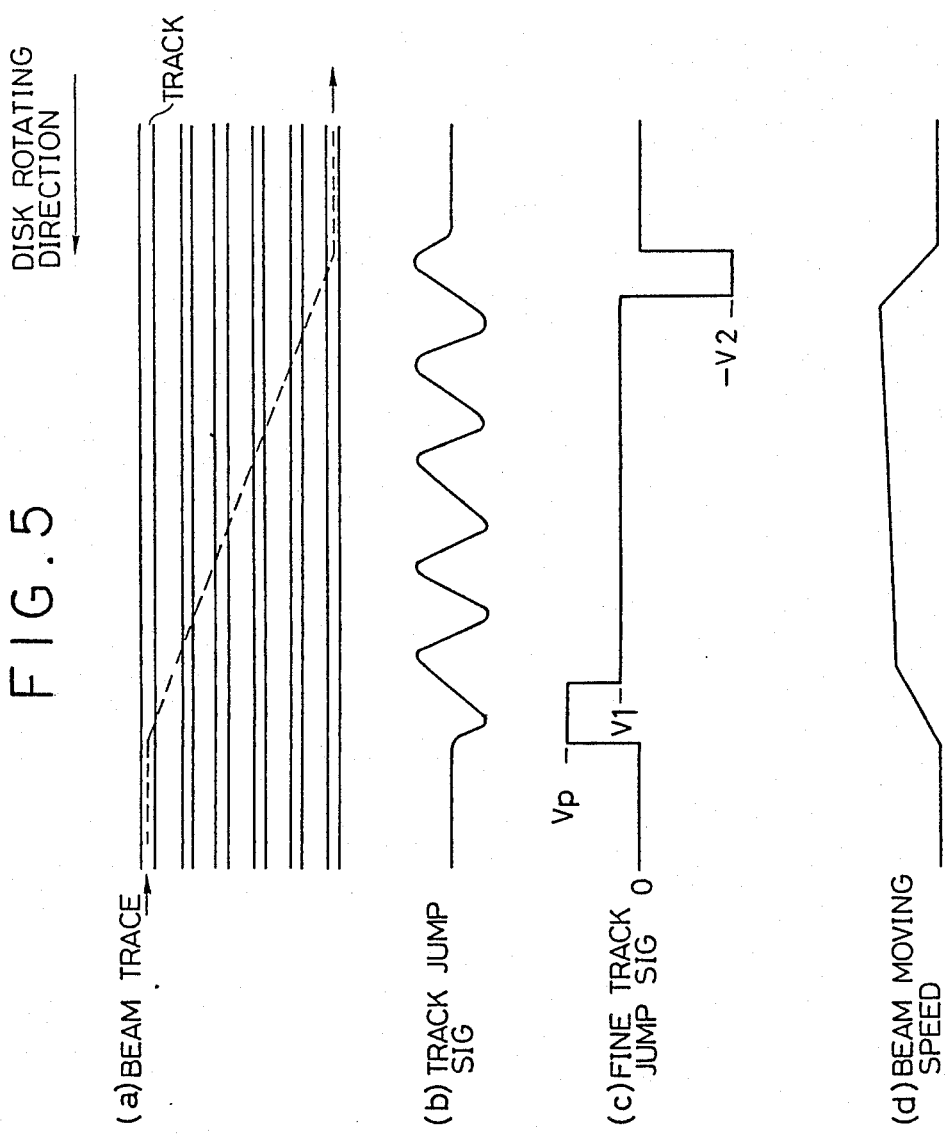
FIG. 5 is a timing chart showing various signal waveforms of a modification of the first embodiment shown in FIGS. 1 and 2.

FIG. 5 illustrates the operation of a modification of the first embodiment of the present invention in which the fine track jump signal shown in FIG. 5(c) is generated. In this modification, the voltage $V_p$ is maintained at a constant level for a predetermined time rather than being decreased exponentially as shown in FIG. 3(d), and then dropped abruptly to the constant voltage $V_1$. In this case, the laser beam jumps over the tracks as shown in FIG. 5(a), and the laser beam moving speed becomes essentially constant, as shown in FIG. 5(d). The track signal (having 5 peaks) is shown in FIG. 5(b).

As described above, one feature of the analog-type track jump control system of the present invention is to generate a fine track jump signal having a kick or peak voltage $V_p$, a constant voltage $V_1$, and a reverse voltage $-V_2$ according to the number of tracks to be jumped to achieve a high-speed, accurate fine track jump operation.

Figure 6:
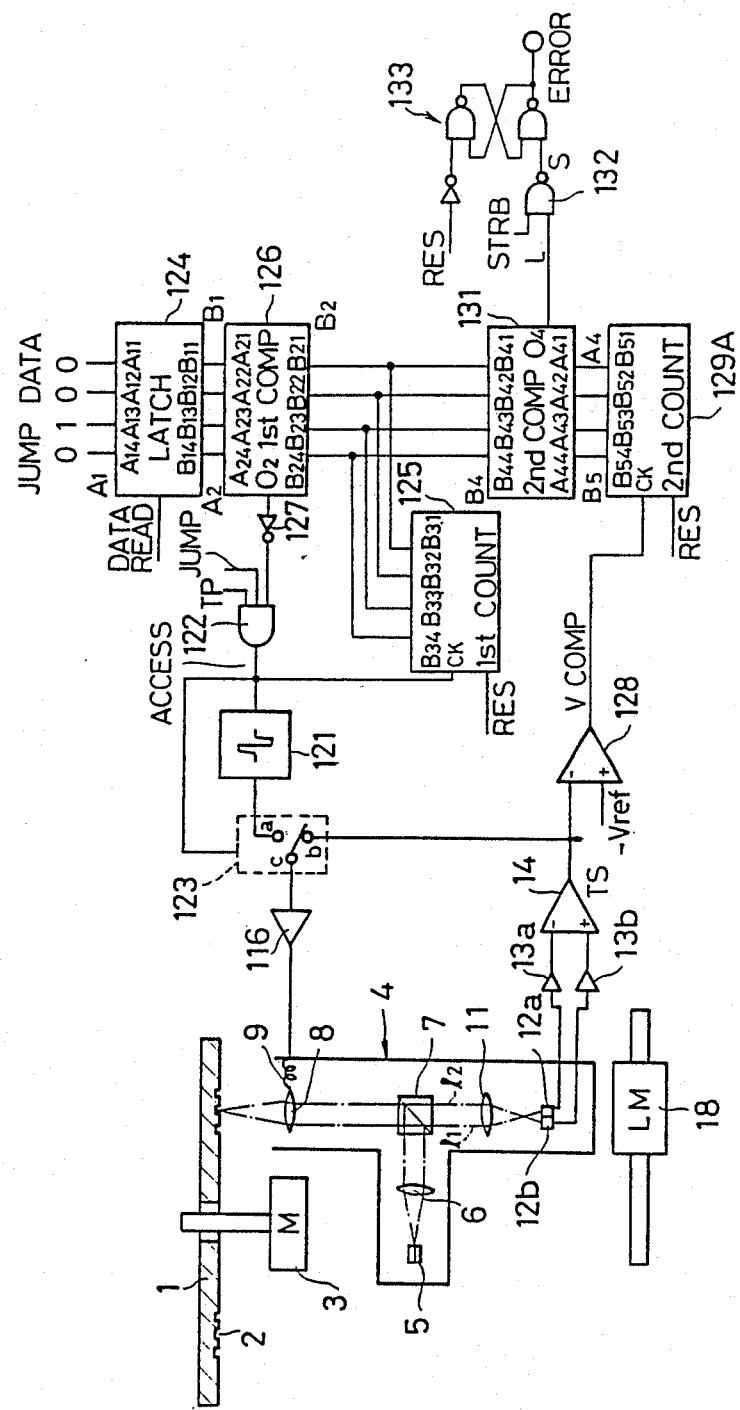
FIG. 6 is a schematic block diagram of a second embodiment of the track jump control system of digital type according to the present invention.

A second embodiment of the track jump control system of the present invention, a digital type, will now be described with reference to FIGS. 6 to 10. FIG. 6 shows a schematic block diagram of an optical disk apparatus in which elements differing from those shown in FIG. 1 are designated by reference numerals of 100 level.

In FIG. 6, a track jump drive pulse generator 121 is provided which corresponds to the fine track jump signal generator 70 of the first embodiment. The apparatus shown in FIG. 6 is provided with a digital track jump signal generator section which includes a latch circuit 124, a first comparator 126, an AND gate 122, the track jump drive pulse generator 121, a switch circuit 123, a buffer circuit 116, and a first counter 125. The apparatus is also provided with a track error detecting section which includes a voltage comparator 128, a second counter 129, a second comparator 131, a NAND gate 1323, and an RS flip-flop 133.

The gate 122 generates an access pulse (ACCESS) for controlling the track jump drive pulse generator 121 by ANDing three signals—a timing signal TP, a jump instruction signal (JUMP), and an output of the first digital comparator 126. The number of timing pulses TP corresponds to the number of tracks to be jumped. In response to this timing pulse TP, the access signal (ACCESS) is generated from the AND gate 122, which causes a plurality of drive pulses to be generated from the track jump drive pulse generator 121. The output of the drive pulse generator 121 is connected to the coil 9 through the switch 123 and the buffer 116. This switch 123 is switched to a contact a when the access signal (ACCESS) is at an "H" level and to a contact b when the access signal is at an "L" level.

The number of tracks to be jumped is determined by the latch circuit 124, the first counter 125, and the first comparator 126.

The latch circuit 124 receives a data word $A_1 = (A_{14} A_{13} A_{12} A_{11})$ designating the number of tracks to be jumped. This data word $A_1$ is sent to the circuit 1234 in response to the "H" level data read signal, and is then latched in response to the "L" level data read signal.

The first counter 125 counts the number of access signals (ACCESS) outputted from the AND gate 122. The first digital comparator 126 receives a track jump number data word $B_1 = (B_{14} B_{13} B_{12} B_{11})$ latched in the latch circuit 124 as a data word $A_2 = (A_{24} A_{23} A_{22} A_{21})$ and also receives a count data word $B_3 = (B_{34} B_{33} B_{32}$ $B_{31}$) counted by the first counter 125 as a data word $B_2 = (B_{24} B_{23} B_{22} B_{21})$. Therefore, the two input data words $A_2$ and $B_2$ are compared by the first digital comparator 126. If $B_2$ is greater than $A_2$, an output terminal $O_2$ of the comparator 126 is set to an "H" level. This "H" level signal is applied to an input terminal of the AND gate 122 via an inverter 127 to stop outputting the timing pulse TP.

A voltage comparator 128 is connected to the output terminal of the differential amplifier 14. A reference voltage $-V_{ref}$ is provided at a non-inverting input terminal of the voltage comparator 128 to compare the track signal TS with the reference voltage $-V_{ref}$. If TS is less than $-V_{ref}$, a pulse $V_{comp}$ is outputted from the voltage comparator 128. That is, the voltage comparator 128 outputs pulses $V_{comp}$ whose number is equal to the number of the track signals TS outputted from the differential amplifier 14.

The second digital counter 129 receives the pulses $V_{comp}$ to count the number of the track signals TS.

The second digital comparator 131 receives the data word $B_3$ counted by the first counter 125 as a data word $B_4 = (B_{44} B_{43} B_{42} (B_{41})$. Comparator 131 also receives a data word $B_5 = (B_{54} B_{53} B_{52} B_{51})$ counted by the second counter 129 as a data word $A_4 = (A_{44} A_{43} A_{42} A_{41})$. Comparator 131 then compares the data words $A_4$ and $B_4$. If $A_4$ is equal to $B_4$, the output terminal $O_4$ is set to an "L" level to indicate a correct track jump operation.

An output terminal $O_4$ of the second digital comparator 131 is connected to one input terminal of the NAND gate 132, and a strobe pulse (STRB) is applied to the other input terminal of the NAND gate 132. An output terminal of the NAND gate 132 is connected to a set terminal of the RS flip-flop 133.

When a strobe pulse (STRB) is applied to the NAND gate 132, an output of the second digital comparator 131 is checked. That is, if $A_4$ is equal to $B_4$ in the second comparator 131, an "L" level signal indicative of a normal track jump is outputted from the output terminal $O_4$ to set the flip-flop 133, so that an "L" level signal indicative of the normal track jump is outputted from an error output terminal (ERROR) of the flip-flop 133. If $A_4$ is not equal to $B_4$, an "H" level signal indicative of the abnormal track jump is outputted from the same output terminal. As described above, it is possible to check whether the track jump operation is normal or abnormal by the second digital comparator 131, the NAND gate 132, and the flip-flop 133.

Figure 7:
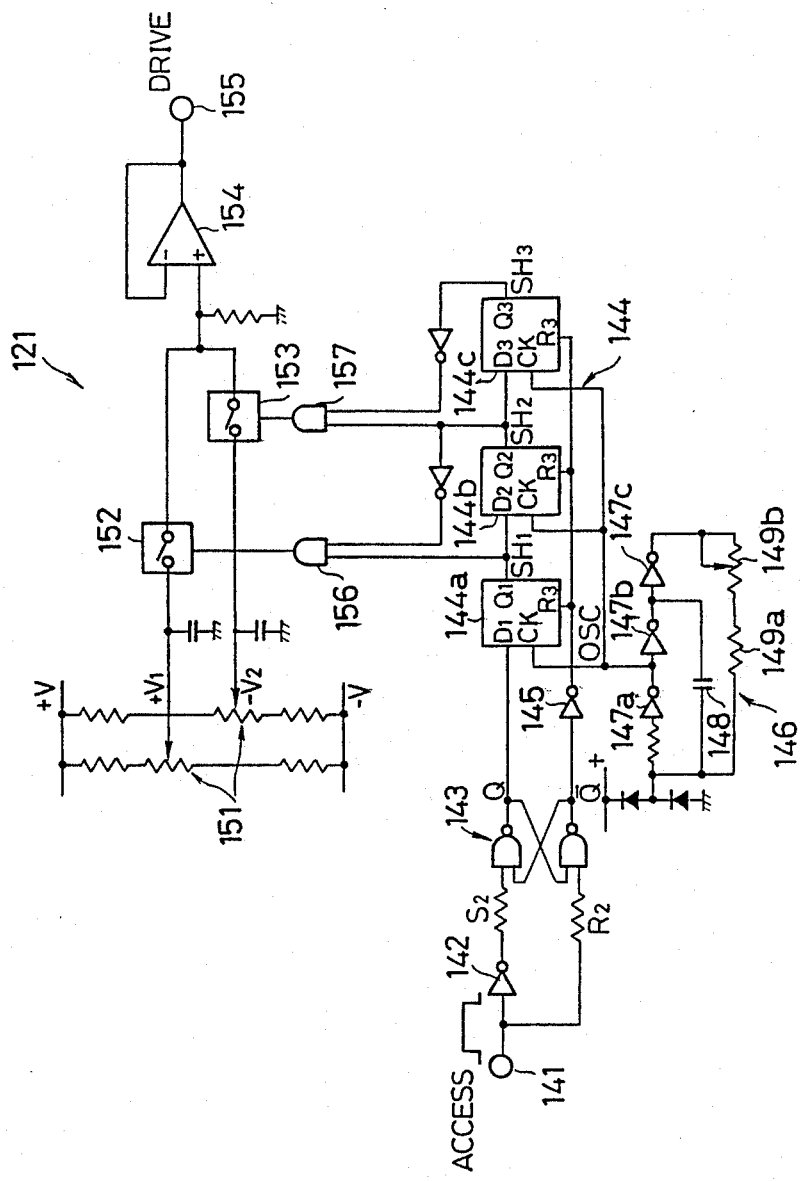
FIG. 7 is a detailed block diagram of a track jump drive signal generator which may be incorporated into the system shown in FIG. 6.
Figure 8:
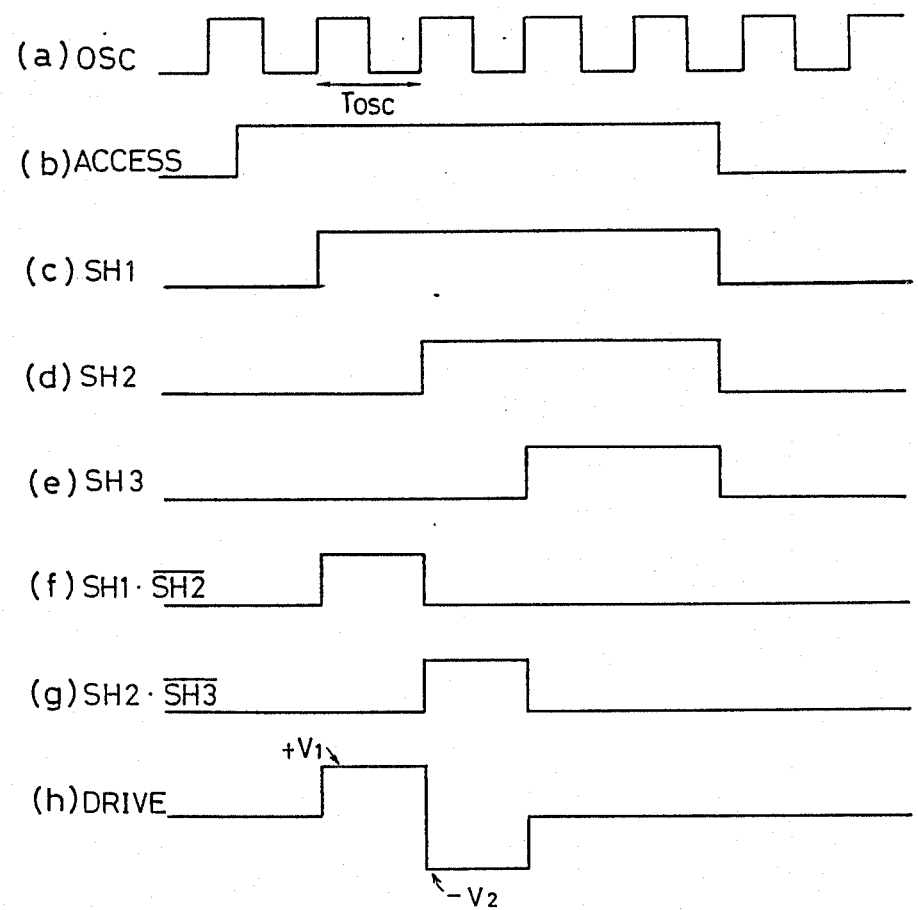
FIG. 8 is a timing chart showing various signal waveforms of the track jump drive signal generator shown in FIG. 7.

The track jump drive pulse generator 121 will now be described in more detail with reference to FIGS. 7 and 8. In FIG. 7, an access pulse (ACCESS) outputted from the AND gate 122 (shown in FIG. 6) to an input terminal 141 is provided to a set terminal $S_2$ of an RS flip-flop 143 via an inverter 142 and a reset terminal $R_2$ of the same flip-flop 143 directly. A three-bit shift register 144 having three D flip-flops 144a to 144c is connected at the succeeding stage of the RS flip-flop 143. A Q terminal of the RS flip-flop 143 is connected via an inverter 145 to three reset terminals $R_3$ of the three D flip-flops 144a to 144c, so that when the access pulse is at an "L" level, an "L" level signal is applied to the reset terminals $R_3$ to reset the three D flip-flops 144a to 144c.

An output terminal of a ring oscillator 146 is connected to three clock terminals CK of the three D flip-flops 144a to 144c. This ring oscillator 146 includes three inverters 147a to 147c, a capacitor 148, and two resistors 149a, 149b. The oscillator 146 generates a clock signal (OSC) with a period $T_{osc}$ determined by the capacitor 48 and the resistors 49a, 49b, as shown in FIG. 8(a).

A potentiometer 151 generates two voltages $+V_1$ and $-V_2$. The voltage $+V_1$ is applied to a non-inverting input terminal (+) of a buffer amplifier 154 via an analog switch 152, while the voltage $-V_2$ is applied to the same non-inverting input terminal (+) via an analog switch 153 to output a track jump drive pulse (DRIVE) from an output terminal 155 of the buffer 154.

An AND gate 156 finds a logical AND product of two outputs $SH_1$ and $SH_2$ of the shift register 144 to apply the logical AND product to the analog switch 152. Further, an AND gate 157 finds a logical AND product of two outputs of $SH_2$ and $SH_3$ of the shift register 144 to apply the logical AND product to the analog switch 153.

The operation of the track jump drive pulse generator 121 will now be described. When the access signal (ACCESS) as shown in FIG. 8(b) is applied to the input terminal 141, the shift register 144 outputs three pulses $SH_1$, $SH_2$, $SH_3$ in sequence in response to the clock signal (OSC) from the ring oscillator 146, as shown in FIGS. 8(c) to (e). The time difference between the leading edges of these three pulses $SH_1$ to $SH_3$ is determined on the basis of a period $T_{osc}$ of the clock signal OSC.

The logical AND product of $SH_1$ and $SH_2$ is found by the AND gate 156, and that of $SH_2$ $_{l and SH_3}$ is found by the AND gate 157, so that the two analog switches 152 and 53 are turned on in sequence when each logical AND product changes to an "H" level.

Therefore, a voltage $+V_1$ is outputted from the output terminal 155 when the analog switch 152 is turned on, and a voltage $-V_2$ i outputted from terminal 155 when the analog switch 153 is turned on. The resulting drive pulse is shown in FIG. 8(h).

Sample values of the drive pulse, which are provided for purposes of illustration and are not intended to be limiting, are as follows:

$T_{osc} = 0.3$ msec $V_1 = 3$ V $V_2 = -3$ V

When this drive pulse is applied to the object lens coil 9, the object lens 8 is moved so that the beam spot jumps one track toward the center of the disk. When these voltages $V_1$, $V_2$ are reversed in polarity, i.e.:

$V_1 = -3$ V $V_2 = 3$ V the beam spot jumps one track outward from the disk center.

Figure 9:
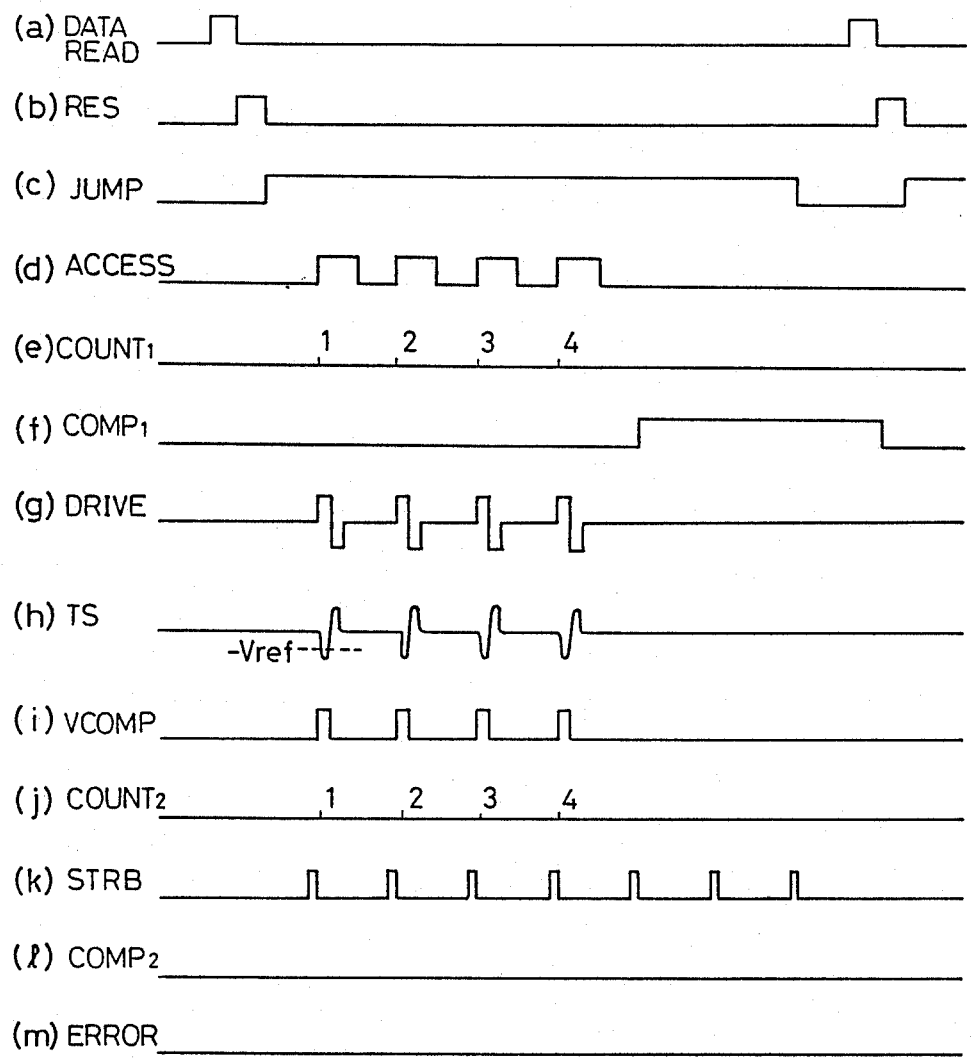
FIG. 9 is a timing chart showing various signal waveforms of the second embodiment of the track jump control system shown in FIG. 6.

With reference to a timing chart shown in FIG. 9, the operation of the track control system shown in FIG. 6 will now be described. The description will be based on the illustrative case where a track jump number data word $A_1 = (0100)$ is sent to the latch circuit 124 to continuously jump the beam spot of the optical disk 1 over 4 tracks.

Before a jump instruction signal is inputted, the first and second counters 125 and 129 are both reset to $B_2 = (0000)$ and $B_5 = (0000)$ in response to a reset signal (RES), as shown in FIG. 9(b).

When the access signal (ACCESS) is not outputted from the AND gate 122, the switch 123 is set to the contact b, as shown in FIG. 6. Under these conditions, the apparatus is set to the tracking mode. Therefore, the servo loop functions operate so that the track (offset) signal TS reaches zero and, therefore, the beam spot follows correctly along a track on the optical disk 1.

The track jump number data word $A_1=(0100)$ applied to the latch circuit 124 is sent to the latch circuit 124 in response to a data read signal of and "H" level, as shown in FIG. 9(a), and latched in response to a data read signal of an "L" level.

Before a jump instruction signal (JUMP) is inputted, the count data word $B_3$ of the first counter 125 is zero. Since $A_2$ is greater than $B_2$, the output terminal $O_2$ of the first comparator 126 is set to an "L" level. Under these conditions, when the jump instruction signal (JUMP) applied to the AND gate 122 changes to an "H" level as shown in FIG. 9(c), a timing pulse (TP) is outputted from the AND gate 122 as an access signal (ACCESS), as shown in FIG. 9(d).

This access signal is counted by the first counter 125, and the counted data word $B_3$ is applied to the first digital comparator 126. When four access pulses have been counted by the first counter 125 as shown in FIG. 9(e), the equality of $A_2$ and $B_2$ is established in the first digital comparator 126, so that an "H" level signal is outputted from the output terminal $O_2$ of comparator 126, as shown in FIG. 9(f), to stop outputting the access signal (ACCESS) from the AND gate 122.

When the access signal is outputted from the AND gate 122, the track jump drive pulse (DRIVE) is generated from the track jump drive pulse generator 121 as shown in FIG. 9(g), so that the switch 123 is set to the contact a to apply the drive pulse (DRIVE) to the coil 9. Accordingly, the beam spot is jumped toward the center of disk 1 track by track.

When the beam spot jumps over one track, a track detecting (offset) signal TS is generated from the differential amplifier 14, as shown in FIG. 9(h). The negative half-wave component of the signal TS is waveform shaped by the voltage comparator 128, so that $V_{comp}$, having the same number of pulses as the track (offset) signal TS, can be obtained through the voltage comparator 128, as shown in FIG. 9(i).

The pulses of $V_{comp}$ are counted by the second counter 129 as shown in FIG. 9(j), and the counted data word $B_5$ is applied to the second digital comparator 131. The second digital comparator 131 compares two data words counted by the first and second counters 125 and 129.

When the track jump operation is performed normally (as desired), the number of the drive pulses (DRIVE) applied to the object lens coil 9 is equal to that of the track (offset) signals TS. The comparison result of the second digital comparator 131 is that $A_4$ is equal to $B_4$ and, therefore, an "L" level is outputted from the output terminal $O_4$ of the second comparator 131.

This "L" level signal from the output terminal $O_4$ is ANDed with a strobe pulse (STRB) as shown in FIG. 9(k) by the NAND gate 132 to output an "H" level signal to the RS flip-flop 133, so that an "L" level signal indicative of a normal track jump operation is outputted from the error terminal of the RS flip-flop 133.

When the track jump operation is abnormal, the comparison result of the second digital comparator 131 is that $A_4$ is not equal to $B_4$. An "H" level signal is outputted from the terminal $O_4$ of the second comparator 131 so that an "H" level signal indicative of an abnormal track jump operation is outputted from the error terminal of the RS flip-flop 133. Once an "H" level error signal is detected, the information reproducing operation is interrupted in response to an interrupt command from the controller to check the track number. If the actual track number obtained from the check does not match, the movement required to correct the error is calculated and the beam spot is moved to the correct track.

The relationship between the track (offset) signal TS and the beam spot position on the disk will now be described in detail in conjunction with the signals, and with reference to FIGS. 10A to 10C.

Figure 10A:
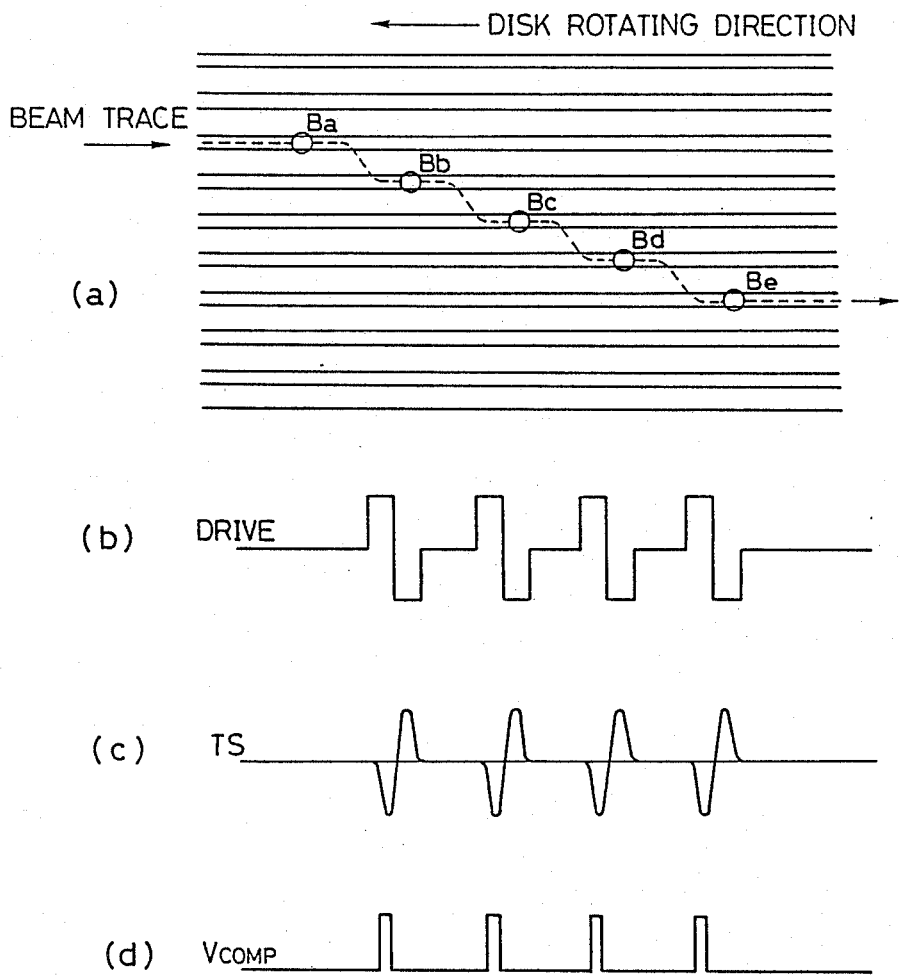
FIG. 10A is a timing chart obtained when a correct plural-track jump operation is performed by the system shown in FIG. 6.

FIG. 10A shows an example in which a 4-track jump operation has been performed correctly or normally. In this case, the beam spot on the disk 1 jumps inward in sequence over four tracks on the basis of 4 drive pulses (DRIVE), so that the beam spot traces a locus (Ba to Be) as shown in FIG. 10A-(a). When the beam spot jumps a track, the differential amplifier 14 generates a track signal TS, so that four normal pulses ($V_{comp}$) are outputted from the voltage comparator 128, as shown in FIG. 10A-(d).

Figure 10B:
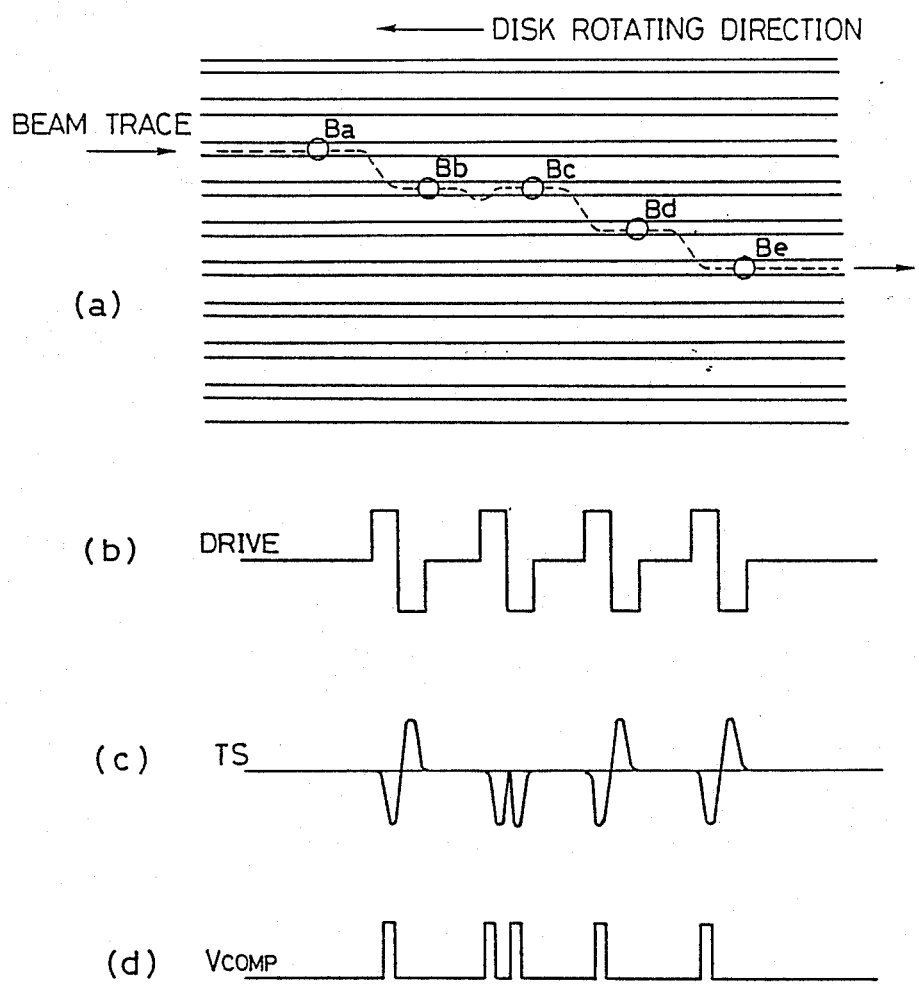
FIG. 10B is a timing chart obtained when an abnormal misjump operation is performed by the system shown in FIG. 6.

FIG. 10B shows an example in which an abnormal track jump operation (misjump) has been performed, i.e., a 3-track jump operation has been performed on the basis of 4 drive pulses (DRIVE). As shown in FIG. 10B-(a), the beam spot does not jump during the jumping process from Bb to Bc, but stays on the same track. At the abnormal position Bb, the track signal TS includes two negative half-cycle signals as shown in FIG. 10B-(c). As a result, since 5-pulses ($V_{comp}$) are outputted from the voltage comparator 128, a data word $B_5=(0100)$ is counted by the second counter 129. Therefore, the comparison result of the second digital comparator 131 is that $A_4$ is not equal to $B_4$, so that an "H" level error signal is outputted from the error terminal of the RS flip-flop 133.

Figure 10C:
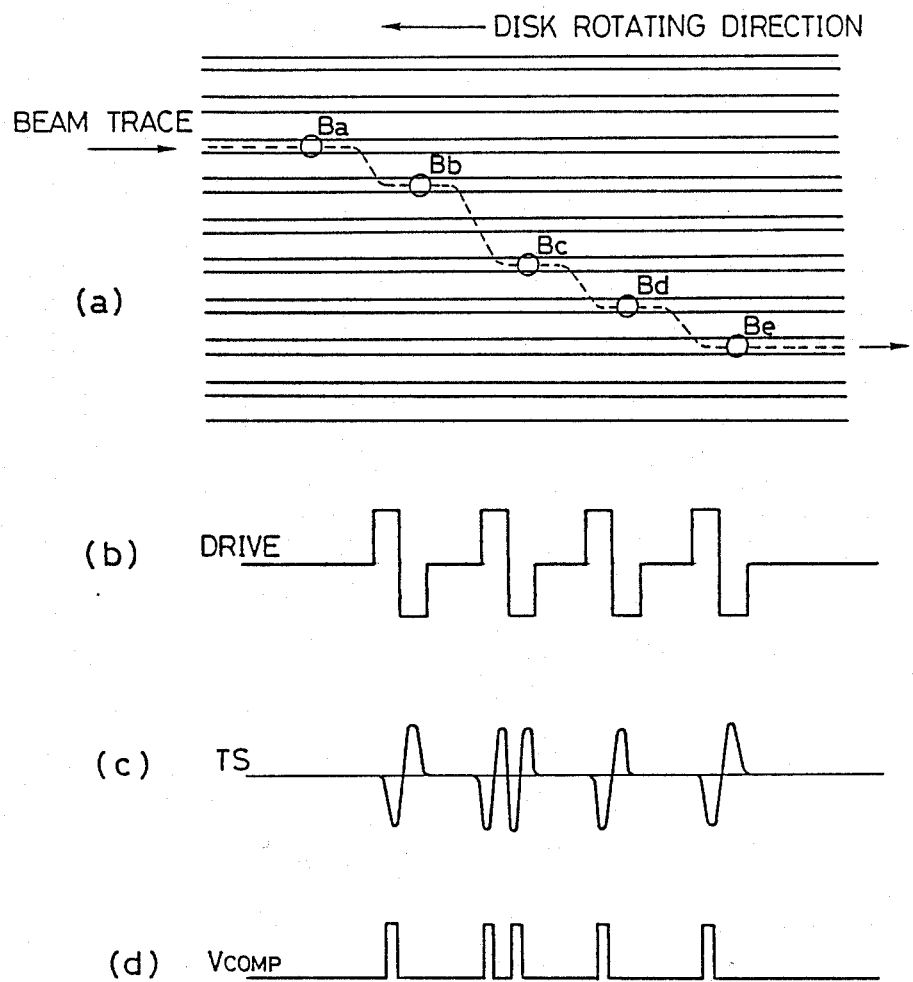
FIG. 10C is a timing chart obtained when an abnormal overjump operation is performed by the system shown in FIG. 6.

FIG. 10C shows another example where an abnormal track jump operation (overjump) has been performed in which a 5-track jump operation has been performed on the basis of 4 drive pulses (DRIVE). As shown in FIG. 10C-(a), the beam spot jumps two tracks during the jumping process from Bb to Bc, i.e., to the succeeding track. At the abnormal position Bb, the track signal TS includes two positive and negative half-cycle signals (a two-cycle signal), as shown in FIG. 10C-(c). As a result, since 5-pulses ($V_{comp}$) are outputted from the voltage comparator 128, as in the case shown in FIG. 10B, an "H" level error signal is outputted from the error terminal of the RS flip-flop 133.

As described above, in the second embodiment of the present invention, the number of access signals applied to the fine track jump drive pulse generator is counted by the first counter, and the number of track signals generated when the beam spot jumps to the adjacent track is counted by the second counter. The two counter values are compared by the second comparator to determine whether the track jump operation has been performed correctly i.e., the match or the mismatch of the two counted values is checked. Therefore, it is possible to perform an accurate track-jumping operation with high speed and reliably.

Figure 11:
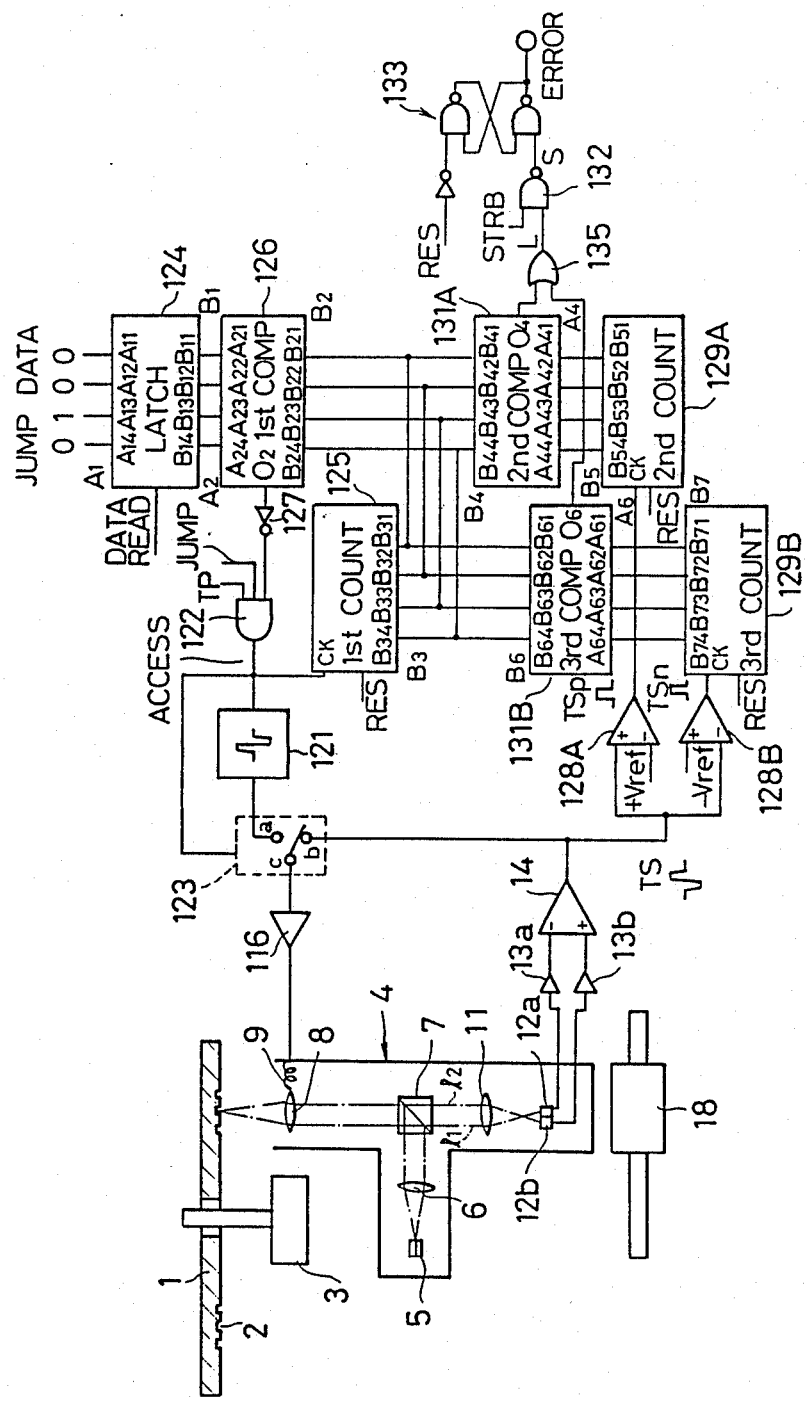
FIG. 11 is a schematic block diagram of a first modification of the track jump control system shown in FIG. 6.

A first modifiction of the second embodiment of the track jump control system of the present invention will now be described with reference to FIGS. 11 to 13. In the basic second embodiment shown in FIG. 6 and described above, the track signal TS detected by the differential amplifier 14 is compared with a negative reference signal −Vref. In this first modification shown in FIG. 11, however, the track signal TS is compared with a positive and a negative reference voltage +Vref and −Vref. A feature of this modification is that abnormal or erroneous track-jumping operations can be identified by counting the number of pulses outputted from two different differential voltages comparators, as described below.

A first voltage comparator 128A and a second voltage comparator 128B are connected in parallel to the output of the differential amplifier 14. A positive reference voltage +Vref is provided at an inverting input terminal (−) of the first voltage comparator 128A, while a negative reference voltage −Vref is provided at a non-inverting input terminal (+) of the second voltage comparator 128B. The output of the differential amplifier 14 is connected to a non-inverting terminal (+) of the first voltage comparator 128A and an inverting terminal (−) of the second voltage comparator 128B. The first voltage comparator 128A compares the track signal TS with +Vref and outputs a first track signal TSp if TS is greater than +Vref. The second voltage comparator 128B compares the tack signal TS with −Vref and outputs a second track signal TSn if TS is less than −Vref.

An output terminal of the first voltage comparator 128A is connected to a second digital counter 129A to count the number of the first track signals TSp indicative of the positive waveforms of the track signal TS. Similarly, an output terminal of the second voltage comparator 128B is connected to a third digital counter 129B to count the number of the second track signals TSn indicative of the negative waveforms of the track signal TS.

A second digital comparator 131A receives a count data word $B_3$ of the first counter 125 as a data word $B_4$ =($B_{44}$ $B_{43}$ $B_{42}$ $B_{41}$) and also receives a count data word $B_5$ =($B_{54}$ $B_{53}$ $B_{52}$ $B_{51}$) of the second counter 129A as a data word $A_4$ =($A_{44}$ $A_{43}$ $A_{42}$ $A_{41}$). Comparator 131A then compares the data words $A_4$ and $B_4$. If $A_4$ is equal to $B_4$, an "L" level signal is outputted from an output terminal $O_4$ of comparator 131A.

A third digital comparator 131B receives the count data word $B_3$ of the first counter 125 as a data word $B_6$ =($B_{64}$ $B_{63}$ $B_{62}$ $B_{61}$) and also receives a count data word $B_7$ =($B_{74}$ $B_{73}$ $B_{72}$ $B_{71}$) of the third counter 129B as a data word $A_6$ =($A_{64}$ $A_{63}$ $A_{62}$ $A_{61}$). Comparator 131B then compares the data words $A_6$ and $B_6$. If $A_6$ is equal to $B_6$, an "L" level signal is outputted from an output terminal $O_6$ of comparator 131B.

Both of the output signals of the second and third digital comparators 131A and 131B are ORed by an OR gate 135 connected to an input terminal of the NAND gate 132. As described above, the normality or abnormality of track jump operation can be checked by comparing values counted by the second and third counters 129A and 129B with a value counted by the first counter 125.

Figure 12:
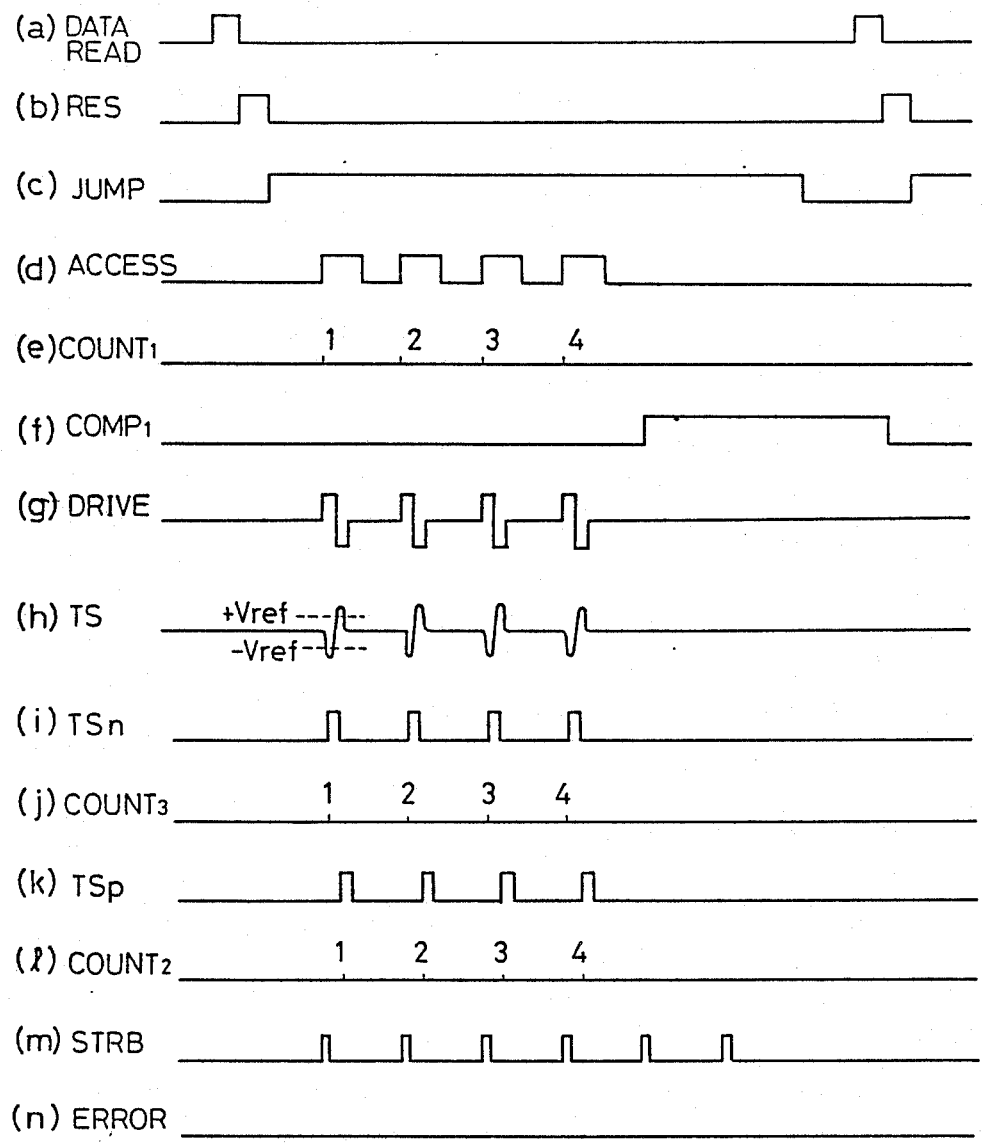
FIG. 12 is a timing chart showing various signal waveforms of the first modification of the second embodiment shown in FIG. 11.

With reference to FIG. 12, when the beam spot jumps over a track, the track jump signal TS as shown in FIG. 12(h) is generated from the differential amplifier 14. The positive waveform component of the pulse signal TS is waveform shaped into the pulse TSp by the first voltage comparator 128A as shown in FIG. 12(k). The negative waveform component of the pulse signal TS is waveform shaped into the pulse TSn by the second voltage comparator 128B as shown in FIG. 12(i).

The positive pulses TSp are counted by the second counted 129A as shown in FIG. 12(l), and the counted data word $B_5$ is inputted to the second digital comparator 131A to compare the data word of the first counter 125 with that of the second counter 129A. Similarly, the negative pulses TSn are counted by the third counter 129B as shown in FIG. 12(j), and the counted data word $B_7$ is inputted to the third digital comparator 131B to compare the data word of the first counter 125 with that of the third counter 129B.

When a plural-track jump operation has been performed correctly, since the number of pulses of the access signal matches the number of pulses of the track signal TS, the number of the positive and negative waveforms TSp and TSn of the track signal TS match the number of drive pulses (DRIVE). That is, since $A_4$ is equal to $B_4$ and $A_6$ is equal to $B_6$, the comparators 131A and 131B output an "L" level signal to the OR gate 135 through the terminals $O_4$ and $O_6$ and, therefore, the OR gate 135 also outputs an "L" level signal. As a result, an "L" level signal indicative of a normal operation is outputted from the error terminal of the RS flip-flop 133, as described above for the first embodiment.

Figure 13A:
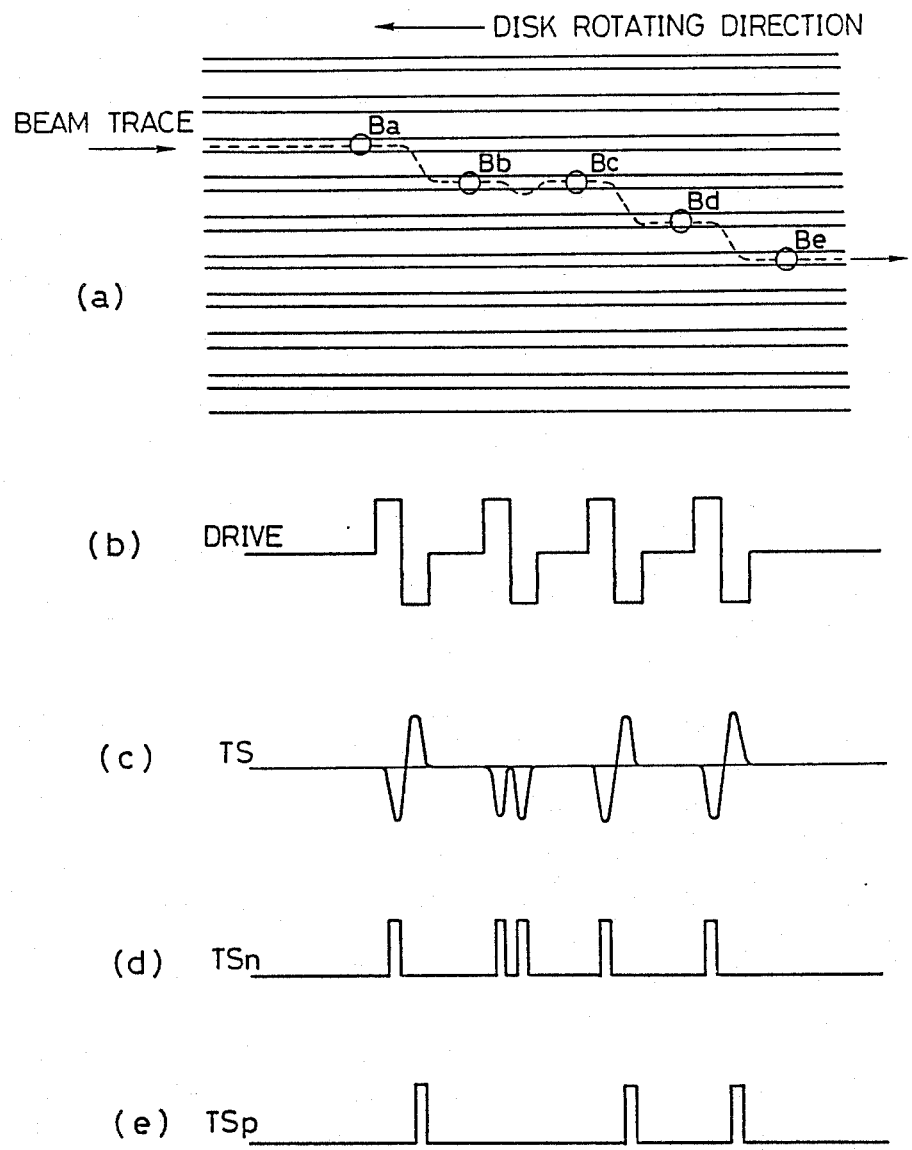
FIG. 13A is a timing chart obtained when an abnormal misjump operation is performed by the system shown in FIG. 11.

FIG. 13A shows an example of abnormal track jump operations in which a misjump occurs. At the misjump track, two negative waveforms are generated as the track signal TS. Therefore, in spite of the fact that four access signals (ACCESS) are applied, three positive waveform pulses TSp are outputted from the first voltage comparator 128A as shown in FIG. 13(e), while five negative waveform pulses TSn are outputted from the second voltage comparator 128B as shown in FIG. 13A-(d).

Figure 13B:
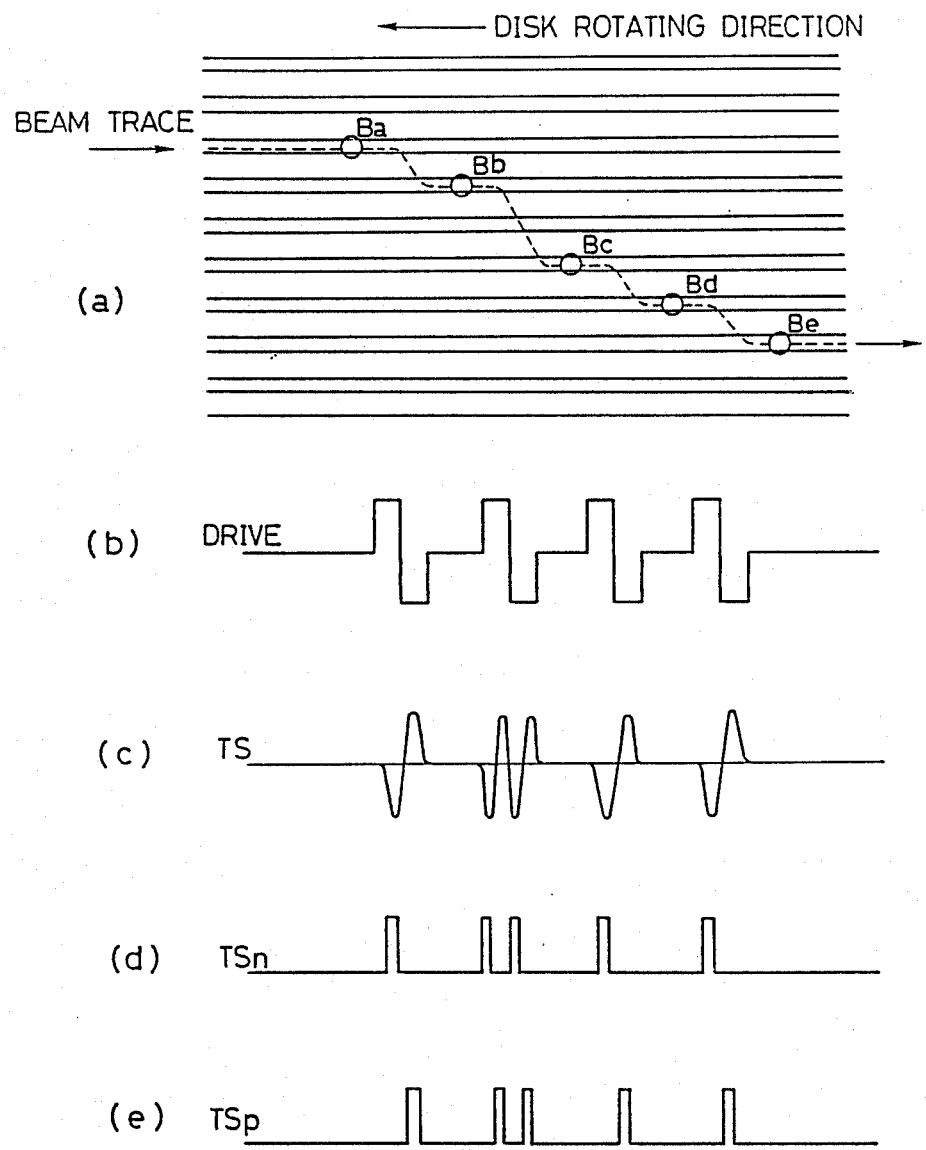
FIG. 13B is a timing chart obtained when an abnormal overjump operation is performed by the system shown in FIG. 11.
Figure 14:
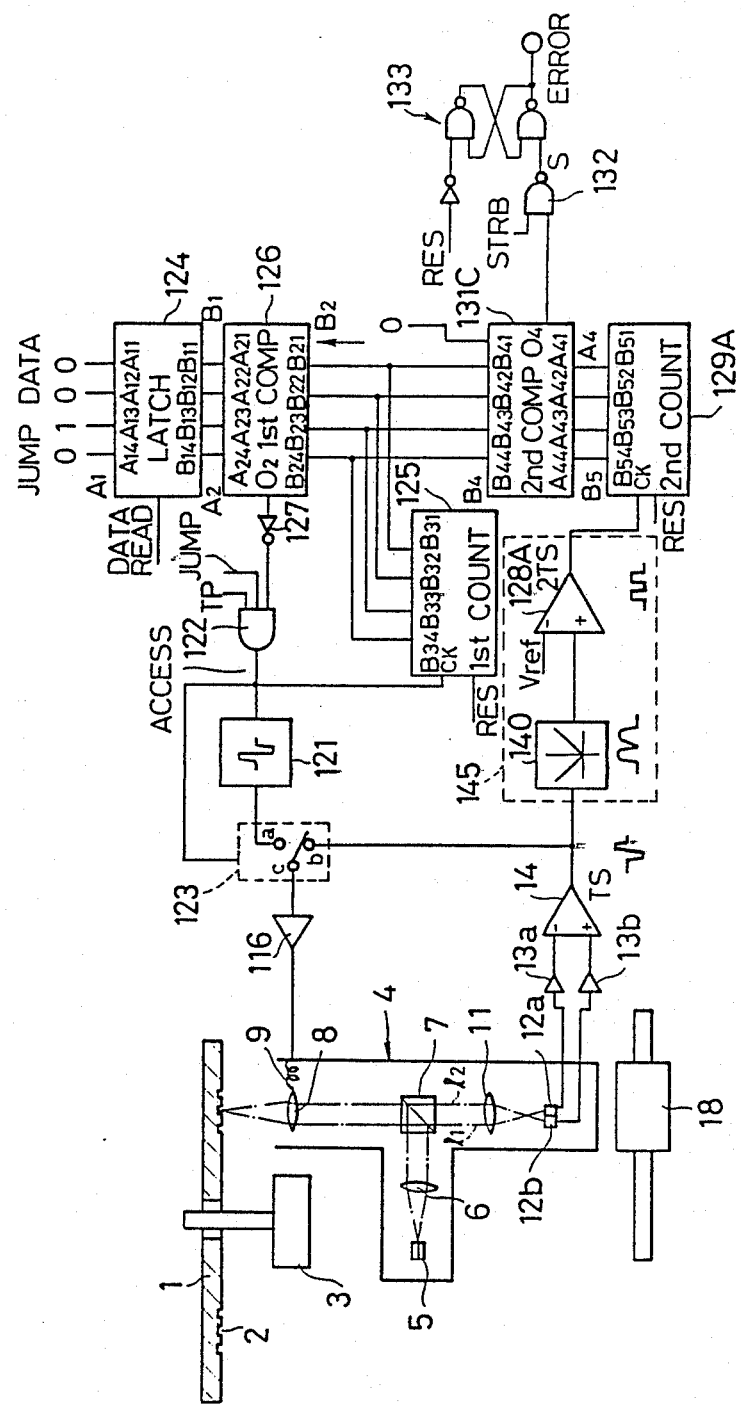
FIG. 14 is a schematic block diagram of a second modification of the track jump control system shown in FIG. 6.
Figure 19:
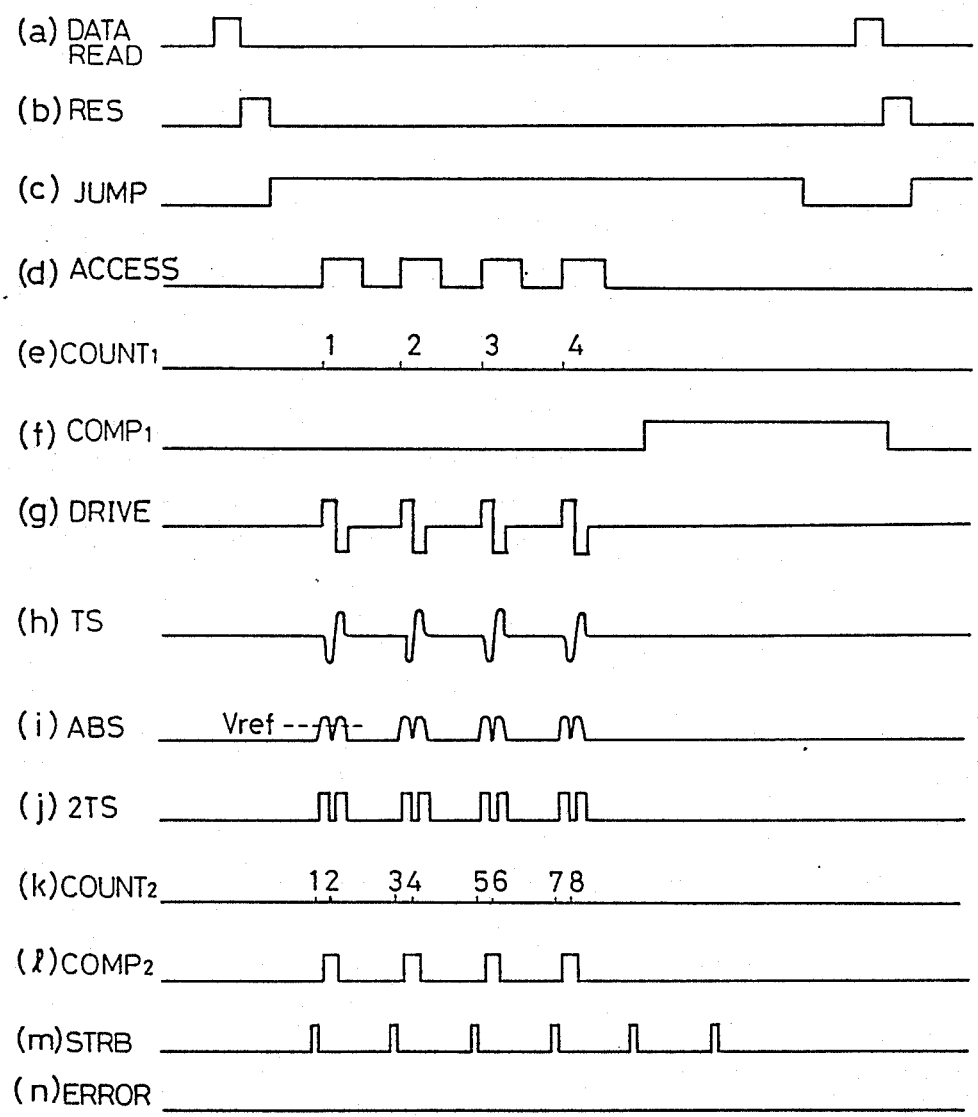
FIG. 19 is a timing chart obtained when an abnormal misjump operation is performed by the system shown in FIG. 14.

FIG. 13B shows another example of abnormal track jump operations in which an overjump occurs. At the overjump track, two positive and negative waveforms are generated as the track signal TS. Therefore, five positive and negative waveform pulses TSp and TSn are outputted from the first and second voltage comparators 128A and 128B as shown in FIG. 13B-(d) and (e). In comparing the three pulses TSp shown in FIG. 13A-(e) with the five pulses TSp shown in FIG. 13B-(e), it is possible to identify the misjump operation from the overjump operation by counting the number of pulses TSp outputted from the first voltage comparator 128A.

A second modification of the second embodiment of the present invention will now be described with reference to FIGS. 14 to 20. In the basic second embodiment shown in FIG. 6, the track signal TS detected by the differential amplifier 14 is compared with a negative reference signal −Vref. In this second modification shown in FIG. 14, however, the track signal TS is full-wave rectified before compared with a positive reference signal Vref. Therefore, in this modification, erroneous track jump operations can also be identified by counting the number of pulses outputted from the differential voltage comparator 14.

An absolute value circuit 140, which differs from the system shown in FIG. 6, is connected to the differential amplifier 14 to obtain an absolute value of a track signal TS with positive and negative waveforms. That is, the absolute value circuit 140 includes a full-wave rectifier, for example, as disclosed in U.S. Pat. No. 4,333,141.

The voltage comparator 128A has an inverting input terminal (−) to which a positive reference voltage Vref is applied, and is connected to the absolute-value circuit 140 to form a double track signal generator 145 including the absolute-value circuit 140 and the voltage comparator 128A.

FIGS. 15 and 16 show another modification of the double track signal generator 145 which includes two voltage comparators 265, 266 and an OR gate 267. As shown, a positive reference voltage +Vref is provided at the inverting input terminal to the voltage comparator 265, while a negative reference voltage −Vref is provided at the non-inverting input terminal to the voltage comparator 266. The OR gate 267 is connected to the two voltage comparators 265, 266 to obtain logical OR sum, i.e., to generate the double track signal 2TS as shown in FIG. 16.

FIGS. 17 and 18 show another modification of the double track signal generator 145 which includes a square-law circuit 268 and the voltage comparator 128A. In the absolute value circuit 140, the amplitude of the output signal increases in proportion to the voltage of the input signal, while in the square-law circuit 268, the amplitude of the output signal increases with increasing voltage of the input signal in accordance with a quadratic curve. Using the circuit shown in FIG. 17, it is possible to generate the double track signal 2TS as shown in FIG. 18.

The output of the double track signal generator 145 is connected to the second counter 129A to set the double track signals 2TS as a count data word $B_5 = (B_{55} B_{54} B_{53} B_{52} B_{51})$. The second digital comparator 131C receives a count data word $B_3$ of the first counter 125 as a data word $B_4 = (B_{44} B_{43} B_{42} B_{41})$ and adds a one-bit datum $B_{40} = $ "0" to the least significant bit $B_{41}$ to multiply the data word $B_4$ by a proportional constant 2. The second digital comparator 131C also receives the data word $B_5$ of the second counter 129 as a data word $A_4 = (A_{44} A_{43} A_{42} A_{41} A_{40})$ to compare the input data words $A_4$ and $B_4$. If $A_4$ is equal to $B_4$, an "L" level signal is outputted from the output terminal $O_4$ of the comparator 131C to indicate a normal track jump operation, as shown by the timing chart of FIG. 19.

Figure 20A:
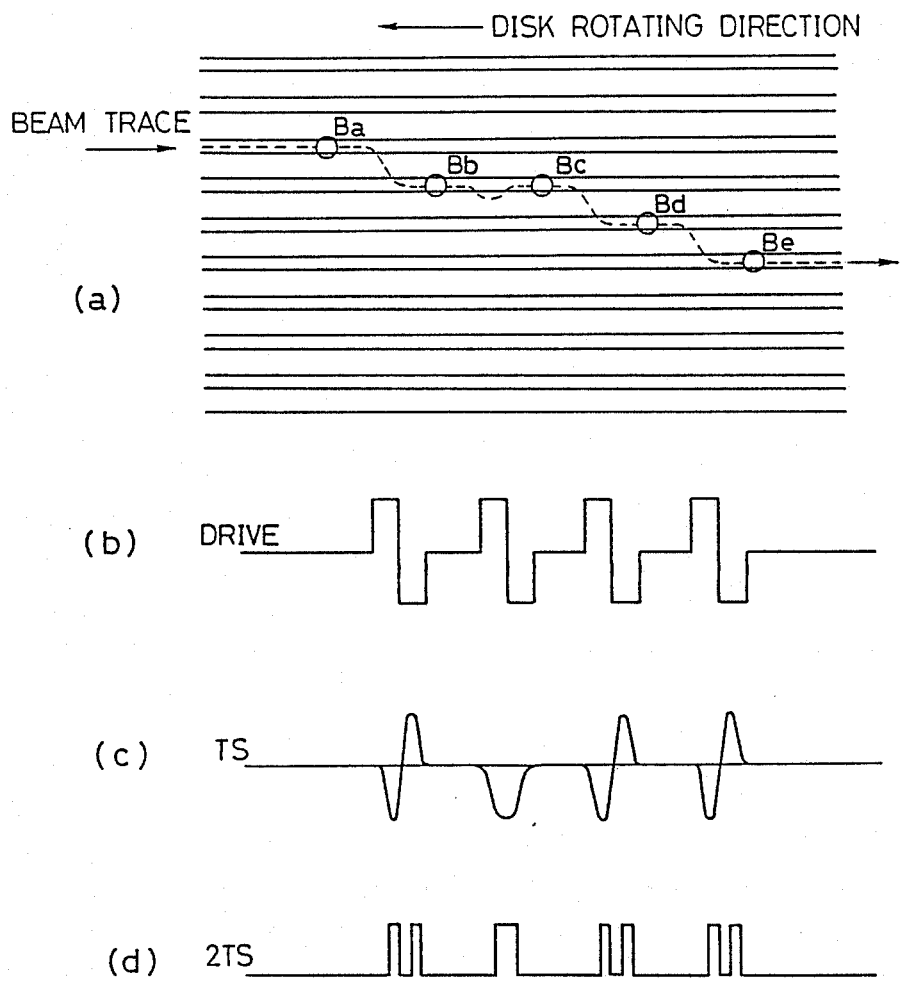
FIG. 20A is a timing chart obtained when an abnormal misjump operation is performed by the system shown in FIG. 14.
Figure 20B:
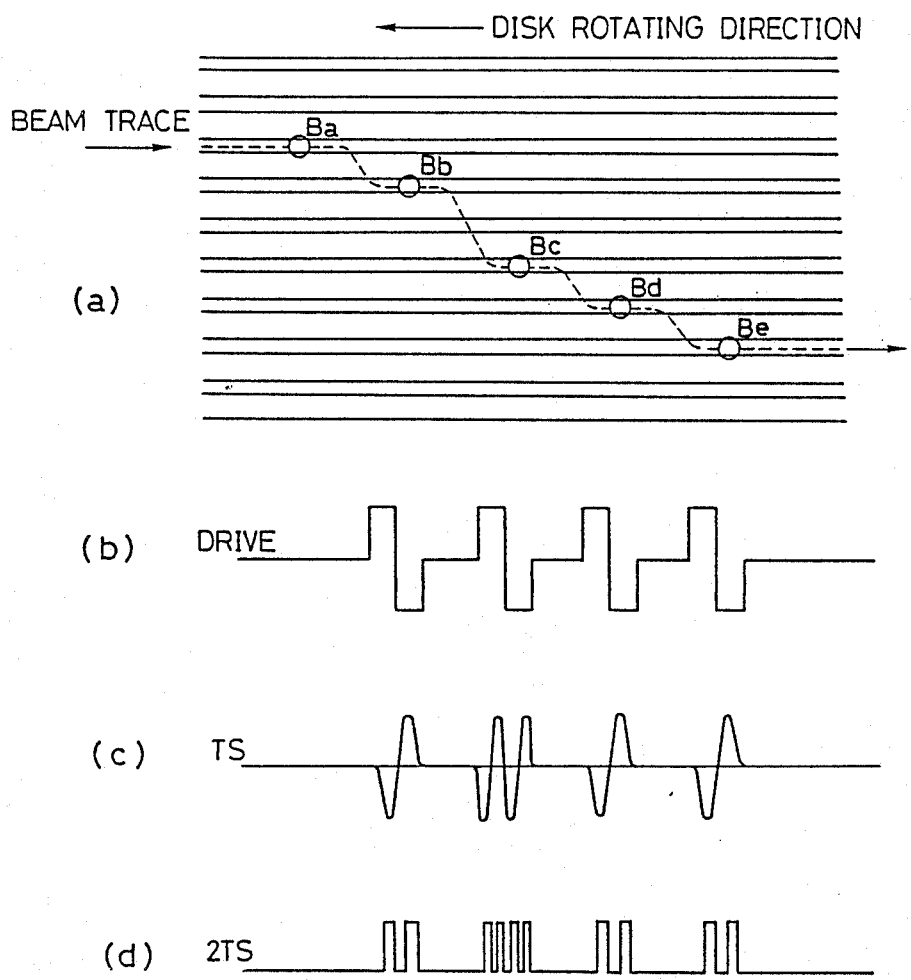
FIG. 20B is a timing chart obtained when an abnormal overjump operation is performed by the system shown in FIG. 14.

FIG. 20A shows the track signal TS and the double track signal 2TS obtained when a misjump occurs, while FIG. 20B shows the two signals TS and 2TS obtained when an overjump occurs. As shown, it is possible to discriminate between a misjump and an overjump on the basis of the double track signals 2TS.

Figure 21:
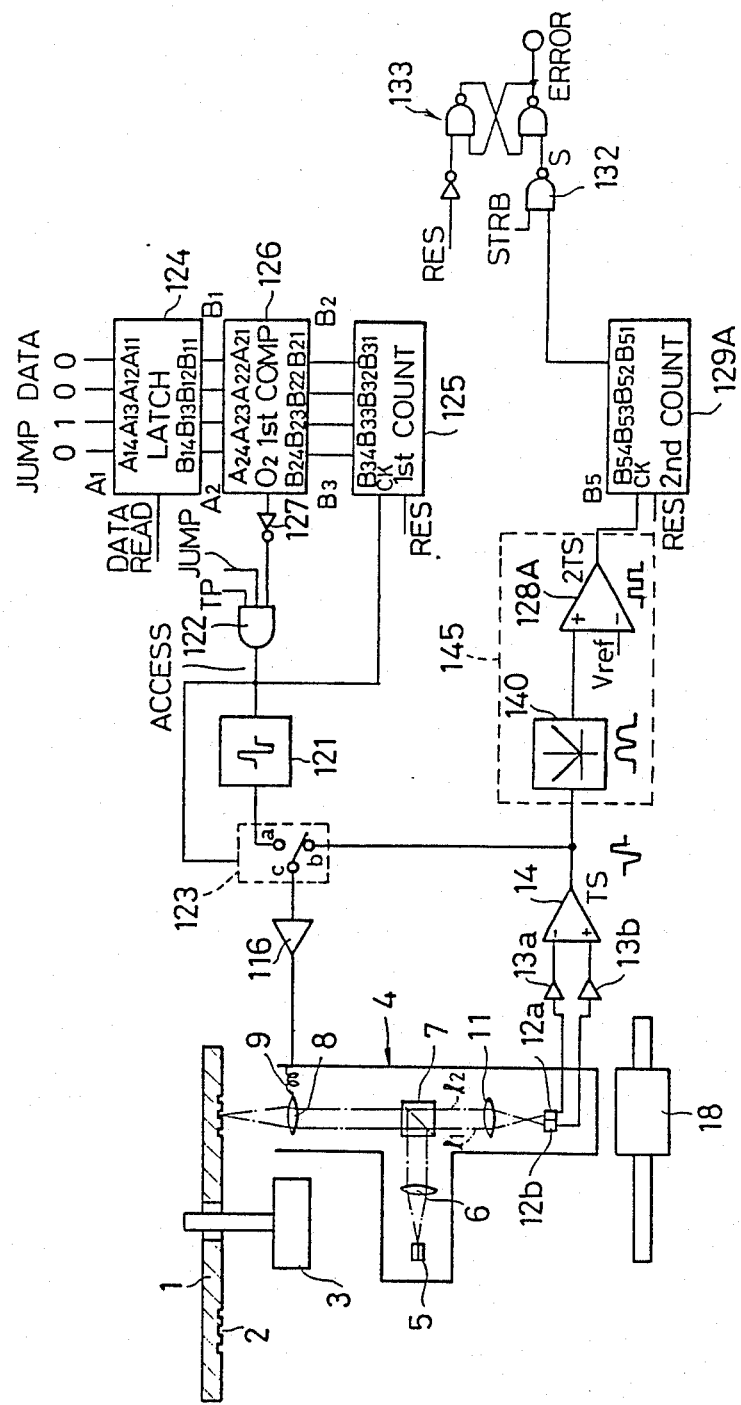
FIG. 21 is a schematic block diagram of a third modification of the track jump control system shown in FIG. 6.

A third modification of the second embodiment of the present invention will now be described with reference to FIG. 21. In this modification, the double track signals 2TS generated by the double track pulse generator 145 are counted by the second counter 129 to check only the least significant bit of the counted data. This is because when a track jump operation has been performed correctly, double track signals 2TS of an even number will necessarily be generated for each track jump operation. Therefore, it is possible to check a correct track jump operation by checking only the least significant bit of the counted signal 2TS, thus simplifying the circuit configuration.

The output terminal of the voltage comparator 128A is connected to the second counter 129A, so that the second counter 129A receives the double track signal 2TS as a count data word $B_5 = (B_{55} B_{54} B_{53} B_{52} B_{51})$. An output terminal of the least significant bit (LSB) of the second counter 129A is connected to one input terminal of the NAND gate 132.

When a correct track jump operation has been performed, the count data word $B_5$ is an even number in the second counter 129A and the least significant bit $B_{51}$ is a "0" bit, so that an "L" level signal indicative of a normal track jump operation is applied to the RS flip-flop 133 via the NAND gate 132.

By contrast, where an erroneous track jump operation has been performed as shown in FIG. 20A, since the count data word $B_5$ (i.e. 2TS) is an odd number in the second counter 129A as shown in FIG. 20A-(d) and, therefore, the least significant bit $B_{51}$ is a "1" bit, an "H" level signal indicative of an abnormal track jump operation is applied to the RS flip-flop 133 via the NAND gate 132. However, in case an excessive jump or overjump occurs as shown in FIG. 20B-(a), since the number of the double track signals 2TS is even, it is impossible to detect an erroneous double-track jump operation of this type.

As described above, features of the track jump control system of digital type according to the present invention include checking the correct plural-track jump operation by comparing the number of track access signals (ACCESS) with that of track signals (TS) indicative of actual track jumps. Therefore, it is possible to effect a high-speed, stable, plural-track jump operation.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the general inventive concept as defined by the appended claims and their equivalents.

What is claimed is:

1. A track jump control system for an optical disk apparatus for recording and reproducing information in or from an optical disk by an optical beam, said track jump control system comprising:
    optical beam moving means for moving the optical beam along a radial dimension of the optical disk; and
    track jump signal generating means operatively coupled to said optical beam moving means for providing an analog track jump signal to said optical beam moving means to command said optical beam moving means to jump the optical beam over a designated plurality of tracks in a single substantially continuous movement in response to a track jump command signal, the analog track jump signal including a kick pulse with a voltage $V_p$ for accelerating the optical beam, a constant amplitude pulse with a voltage $V_1$ for moving the optical beam at a constant speed, and a stop pulse with a voltage $−V_2$ for decelerating the moving optical beam, said kick pulse voltage $V_p$ being greater than said constant amplitude pulse voltage $V_1$, and said constant amplitude pulse voltage being greater than said stop pulse voltage $−V_2$.

2. The track jump control system as set forth in claim 1, wherein the track jump signal generating means comprises:
    (a) a flip-flop circuit activated in response to a track jump start signal to output a flip-flop signal;
    (b) a first monostable multivibrator triggered in response to said flip-flop signal to output a first multivibrator signal with a first pulse width $t_1$ determined in accordance with the designated number of tracks to be jumped, said first monostable multivibrator being adapted to output a reset signal;

(c) an AND gate for ANDing said flip-flop signal and said first monostable multivibrator reset signal to output an AND product signal;
(d) a second monostable multivibrator triggered in response to said AND product signal to output a second multivibrator signal with a second pulse width $t_2$;
(e) a kick voltage generator having a Zener diode and a capacitive-resistive (CR) circuit for generating a kick signal with a peak voltage $V_p$;
(f) a potentiometer for supplying a first voltage $V_1$ and and a second voltage $-V_2$;
(g) a first analog switch connected to said kick voltage generator for supplying said kick signal to said optical beam moving means when closed in response to said first multivibrator signal;
(h) a second analog switch connected to said potentiometer for supplying said first voltage $V_1$ to said optical beam moving means when said second analog switch is closed in response to said first multivibrator signal for a duration determined by said first pulse width $t_1$; and
(i) a third analog switch connected to said potentiometer for supplying said second voltage $-V_2$ to said optical beam moving means when said third analog switch is closed in response to said second multivibrator signal for a duration determined by said second pulse width $t_2$.

3. A track jump control system for an optical disk apparatus for recording and reproducing information in or from an optical disk by an optical beam, said track jump control system comprising:
optical beam moving means for moving the optical beam along a radial dimension of the optical disk;
track jump signal generating means operatively coupled to said optical beam moving means for providing a digital track jump signal to said optical beam moving means to cause said optical beam moving means to jump the optical beam over a designated number of tracks in a single substantially continuous movement in response to a track jump command signal, said track jump signal generating means including,
first comparing means operatively coupled to said optical beam moving means for generating a plurality of track access signals indicative of the designated number of tracks to be jumped,
track jump drive pulse generating means operatively coupled to said first comparing means and to said optical beam moving means for outputting track jump pulses to said optical beam moving means in accordance with the track access signals to selectively move said optical beam moving means, and
first counting means operatively coupled to said first comparing means for counting the track access signals to obtain a track access signal count and communicating the track access signal count to said first comparing means to cause said first comparing means to compare the track access signal count with the designated number of tracks and terminate generation of the track access signals when the track access signal count is at least the designated number of tracks to be jumped;
track signal generating means for generating a track signal when the optical beam jumps across a track on the optical disk; and
erroneous track jump detecting means operatively coupled to said track signal generating means for detecting whether the optical beam has correctly jumped over the designated number of tracks in response to the track signal.

4. The track jump control system as set forth in claim 3, further comprising switch means for selectively connecting said optical beam moving means to said erroneous track jump detecting means to cause said erroneous track jump detecting means to determine the difference between the number of tracks which has been jumped and the designated number of tracks and to command said optical beam moving means to move the optical beam in response to the difference, and for selectively connecting the optical beam moving means to said track signal generating means to cause the optical beam to jump over the designated number of tracks in response to the digital track jump signal.

5. A track jump control system for an optical disk apparatus for recording and reproducing information in or from an optical disk by an optical beam, said track jump control system comprising:
optical beam moving means for moving the optical beam along a radial dimension of the optical disk;
track jump signal generating means operatively coupled to said optical beam moving means for providing a digital track jump signal to said optical beam moving means to cause said optical beam moving means to jump the optical beam over a designated number of tracks in a single substantially continuous movement in response to a track jump command signal; said track jump signal generating means including,
a latch circuit for latching a data word representative of the designated plurality of tracks to be jumped,
a first comparator for generating a plurality of track access signals according to the data word representative of the designated plurality of tracks to be jumped,
a fine track jump drive pulse generator for outputting fine track jump pulses to said optical beam moving means in response to said track access signals from said first comparator;
a first counter for counting the number of said plural track access signals, said first comparator outputting said track access signals until said track access signals counted by said first counter match the data word;
track signal generating means for generating a track signal when the optical beam jumps across a track on the optical disk; and
erroneous track jump detecting means operatively coupled to said track signal generating means for detecting whether the optical beam has correctly jumped over the designated number of tracks in response to the track signal.

6. The track jump control system as set forth in claim 5, further comprising an AND gate for finding an AND product of an output signal of said first comparator, a jump instruction signal, and a timing signal to output said plural track access signals.

7. A track jump control system for an optical disk apparatus for recording and reproducing information in or from an optical disk by an optical beam, said track jump control system comprising:
optical beam moving means for moving the optical beam along a radial dimension of the optical disk;
track jump signal generating means operatively coupled to said optical beam moving means for providing a digital track jump signal to said optical beam moving means to cause said optical beam moving means to jump the optical beam over a designated number of tracks in a single substantially continuous movement in response to a track jump command signal;

track signal generating means for generating a track signal when the optical beam jumps across a track on the optical disk; and erroneous track jump detecting means operatively coupled to said track signal generating means for detecting whether the optical beam has correctly jumped over the designated number of tracks in response to the track signal, said erroneous track jump detecting means including, (a) a voltage comparator for generating a plurality of pulses $V_{comp}$, each of said pulses $V_{comp}$ pulses being generated when a track signal TS generated from said track signal generating means exceeds a predetermined reference level, (b) a second counter for counting the number of said pulses $V_{comp}$ generated by said voltage comparator, and (c) a second comparator for comparing the number of said track access signals counted by said first counter with the number of said pulses $V_{comp}$ counted by said second counter and outputting an erroneous track jump signal when said number of track access numbers does not match said number of pulses $V_{comp}$.

8. A track jump control system for an optical disk apparatus for recording and reproducing information in or from an optical disk by an optical beam, said track jump control system comprising;

optical beam moving means for moving the optical beam along a radial dimension of the optical disk;

track jump signal generating means operatively coupled to said optical beam moving means for providing a digital track jump signal to said optical beam moving means to cause said optical beam moving means to jump the optical beam over a designated number of tracks in a single substantially continuous movement in response to a track jump command signal;

track signal generating means for generating a track signal when the optical beam jumps across a track on the optical disk; and erroneous track jump detecting means operatively coupled to said track signal generating means for detecting whether the optical beam has correctly jumped over the designated number of tracks in response to the track signal, said erroneous track jump detecting means including, (a) first comparator for generating a pulse TSp when a positive track signal generated from said track signal generating means exceeds a predetermined positive reference level, (b) a second comparator for generating a plurality of pulses TSn, each of said pulses being generated when a negative track signal generated from said track signal generating means exceeds a predetermined negative reference value;

(c) a second counter for counting the number of the pulses TSp generated by said first voltage comparator;

(d) a third counter for counting the number of pulses TSn generated by said second voltage comparator;

(e) a second comparator for comparing the number of said tracks access signals counted for said first counter with the number of said pulses TSp counted by said second counter and outputting a first erroneous track jump signal when said number of track access signals is not equal to said number of pulses TSp;

(f) a third comparator for comparing said number of access signals with the number of said pulses TSn counted by said third counter and outputting a second erroneous track jump signal when said number of track access signals is not equal to said number of pulses TSn; and (g) an OR gate for obtaining a logical OR sum of the first and second erroneous track jump signals to output a final erroneous track jump signal.

9. A track jump control system for an optical disk apparatus for recording and reproducing information in or from an optical disk by an optical beam, said track jump control system comprising:

optical beam moving means for moving the optical beam along a radial dimension of the optical disk;

track jump signal generating means operatively coupled to said optical beam moving means for providing a digital track jump signal to said optical beam moving means to cause said optical beam moving means to jump the optical beam over a designated number of tracks in a single substantially continuous movement in response to a track jump command signal;

track signal generating means for generating a track signal when the optical beam jumps across a track on the optical disk; and erroneous track jump detecting means operatively coupled to said track signal generating means for detecting whether the optical beam has correctly jumped over the designated number of tracks in response to the track signal, said erroneous track jump detecting means including, (a) a full-wave rectifier for rectifying the track signals TS generated from said track signal generating means to obtain rectified track signals;

(b) a voltage comparator for generating double track signals 2TS when said full-wave rectifier track signals exceed a reference level, (c) a second counter for counting the number of the double track signals 2TS; and (d) a second comparator for doubling the plural track access signals (ACCESS) counted by said first counter, comparing the double track access signals (2×ACCESS) with said double track signal 2TS, and outputting an erroneous track jump signal when the number of said doubled track access signals is not equal to the number of said double track signals.

10. The track jump control system as set forth in claim 9, further comprising means for checking the least significant digit of the double track signal 2TS counted by said second counter to generate an erroneous track jump signal in case the counted value is an odd number.

11. The track jump control system as set forth in claim 1, wherein the kick pulse voltage level $V_p$ comprises a peak voltage level.

12. The track jump control system for an optical disk apparatus for recording and reproducing information in or from an optical disk by an optical beam, said track jump control system comprising:

optical beam moving means for moving the optical beam along a radial dimension of the optical disk;

track jump signal generating means operatively coupled to said optical beam moving means for providing a digital track jump signal to said optical beam moving means to cause said beam moving means to jump the optical beam over a designated number of tracks in a single substantially continuous movement in response to a track jump command signal, said track jump signal generating means including track access signal generating means operatively coupled to said optical beam moving means for generating the digital track jump signal as a plurality of track access signals indicative of the designated number of tracks to be jumped;

track signal generating means for generating a pulsed track signal when the optical beam jumps across a track on the optical disk; and erroneous track jump detecting means operatively coupled to said track signal generating means for detecting whether the optical beam has correctly jumped over the designated number of tracks, said erroneous track jump detecting means including, first counting means operatively coupled to said track access signal genrating means for counting the track access signals to obtain a track access signal count, second counting means operatively coupled to said track signal generating means for counting the pulses of the track signal to obtain a track signal count, and comparing means operatively coupled to said first and said second counting means for comparing the track access signal count with the track signal count to obtain a difference and outputting an erroneous track jump signal when the difference is other than zero.

13. The track jump control system as set forth in claim 12, wherein:

said erroneous track jump detecting means includes rectifying means operatively coupled to said track signal generating means for rectifying the track signal, and double track signal generating means operatively coupled to said rectifying means and to said second counting means for comparing the rectified track signal with a reference level and generating a rectified pulse double track signal when the rectified track signal exceeds the reference level; and said second counting means counts the rectified pulses of the double track signal to obtain the track signal count.

* * * * *